US012388737B2

(12) United States Patent
Esswie

(10) Patent No.: US 12,388,737 B2
(45) Date of Patent: Aug. 12, 2025

(54) DYNAMIC REPORTING OF PACKET DELAY STATUS INFORMATION

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/529,977

(22) Filed: Dec. 5, 2023

(65) Prior Publication Data
US 2025/0184252 A1 Jun. 5, 2025

(51) Int. Cl.
*H04L 43/0852* (2022.01)
*H04L 43/0876* (2022.01)

(52) U.S. Cl.
CPC ...... *H04L 43/0852* (2013.01); *H04L 43/0876* (2013.01)

(58) Field of Classification Search
CPC .......... H04L 43/0852; H04L 43/0876
See application file for complete search history.

(56) References Cited

U.S. PATENT DOCUMENTS

| 2021/0105762 A1* | 4/2021 | Pezeshki | H04W 72/12 |
| 2024/0259871 A1* | 8/2024 | Wang | H04W 72/231 |
| 2024/0314084 A1* | 9/2024 | Esswie | H04L 47/28 |
| 2024/0314632 A1* | 9/2024 | Esswie | H04L 1/1642 |
| 2024/0414593 A1* | 12/2024 | Lyu | H04W 28/10 |

OTHER PUBLICATIONS

International Search Report and Written Opinion for PCT Application No. PCT/US2024/013868 mailed Sep. 2, 2024, 17 pages.
Linhai He et al: "Delay status reporting for XR", Qualcomm. 3GPP Draft; R2-2309488; Type Discussion; NR_xR_ENH-CORE, vol. 3GPP RAN 2, No. Xiamen, CN; Sep. 2023 [https://www.3gpp.org/ftp/TSG_RAN/WG2_R L2/TSGR2_123bis/Docs/R2-2309488.zipR2-2309488 Delay status reporting forXR.docx] 5 pages.

(Continued)

*Primary Examiner* — June Sison
(74) *Attorney, Agent, or Firm* — Amin, Turocy & Watson, LLP

(57) ABSTRACT

A radio access network node configures a user equipment with a delay status report reporting configuration, which may comprise a remaining latency budget criterion. The user equipment may analyze a traffic packet stored in a buffer to determine whether the remaining latency budget criterion is violated. If a violation of a remaining latency budget criterion has occurred, the user equipment may transmit a delay status report to the node. If the violation of the remaining latency budget criterion corresponds to an occurrence count that violates a remaining latency budget violation count criterion, the user equipment may adjust a remaining latency budget criterion to result in an adjusted remaining latency budget criterion, which may be used for generation and transmission of future delay status reports corresponding to packets stored in the buffer in the future. A remaining latency budget criterion may be adjusted based on a change in buffered traffic volume.

20 Claims, 14 Drawing Sheets

(56) References Cited

OTHER PUBLICATIONS

Linhai He et al: "Introduction of XR enhancements to TS 38.321", Qualcomm. 3GPP Draft; R2-2309316; Type DraftCR; NR_XR_ENH-CORE, vol. 3GPP Ran 2, No. Toulouse, FR; Sep. 2023; [https://www.3gpp.org/ftp/TSG_RAN/WG2_R L2/TSGR2_123/ Docs/R2-2309316.zip R2-2309316 Introduction of XR enhancements to TS 38.321.docx] 31 pages.
OPPO: "Discussion on BSR enhancement for XR", 3GPP Draft; R2-2305533, vol. RAN WG2, No. Incheon, Korea; May 2023, [https://ftp.3gpp.org/tsg_ran/WG2_RL2/T SGR2_122/Docs/R2-2305533.zip R2-2305533—Discussion on BSR enhancement for XR.docx] 4 pages.
Richard Tano et al: "Discussion on BSR enhancements for XR" Ericsson. 3GPP Draft; R2-2311030; Type Discussion; NR_XR_ENH-CORE, vol. 3GPP RAN 2, No. Xiamen, CN; Sep. 2023, [https://www.3gpp.org/ftp/TSG_RAN/WG2_R L2/TSGR2_123bis/ Docs/R2-2311030.zip R2-2311030—Discussion on BSR enhancements for XR.docx] 10 pages.

\* cited by examiner

DYNAMIC REPORTING OF PACKET DELAY STATUS INFORMATION

BACKGROUND

The 'New Radio' ("NR") terminology that is associated with fifth generation mobile wireless communication systems ("5G") refers to technical aspects used in wireless radio access networks ("RAN") that comprise several quality-of-service ("QoS") classes, including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a user equipment comprising a processor, receiving, from a radio access network node, a delay status report reporting configuration comprising at least one delay status report reporting criterion. The method may further comprise determining, by the user equipment, a first characteristic corresponding to a first protocol data unit stored in a memory of the user equipment to result in a determined first characteristic and analyzing, by the user equipment, the determined first characteristic with respect to the at least one delay status report reporting criterion to result in an analyzed determined first characteristic. Based on the analyzed determined first characteristic, the method may further comprise adjusting, by the user equipment, the at least one delay status report reporting criterion to result in at least one adjusted delay status report reporting criterion. The method may further comprise determining, by the user equipment, a second characteristic corresponding to a second protocol data unit stored in the memory of the user equipment to result in a determined second characteristic, and analyzing, by the user equipment, the determined second characteristic with respect to the at least one adjusted delay status report reporting criterion to result in an analyzed determined second characteristic.

In an embodiment, the at least one delay status report reporting criterion may comprise an initial remaining latency budget criterion and a latency violation count criterion corresponding to a violation period. The delay status report reporting configuration may further comprise a remaining latency step value applicable to the adjusting of the at least one delay status report reporting criterion. The first characteristic may be a first remaining latency budget and the determined first characteristic may be a determined first remaining latency budget. The second characteristic may be a second remaining latency budget and the determined second characteristic may be a determined second remaining latency budget. The analyzing of the determined first characteristic may comprise determining that the determined first remaining latency budget is a violation occurrence that corresponds to exceeding the latency violation count criterion during the violation period, and the adjusting of the at least one delay status report reporting criterion may comprise increasing the initial remaining latency budget criterion by the remaining latency step value.

In an embodiment, the at least one delay status report reporting criterion may comprise an initial remaining latency budget criterion and a latency violation count criterion corresponding to a violation period. The delay status report reporting configuration may further comprise a remaining latency step value applicable to the adjusting of the at least one delay status report reporting criterion. The first characteristic may be a first remaining latency budget and the determined first characteristic may be a determined first remaining latency budget. The second characteristic may be a second remaining latency budget and the determined second characteristic may be a determined second remaining latency budget. The analyzing of the determined first characteristic may comprise determining that the determined first remaining latency budget is a violation occurrence that corresponds to failure to exceed the latency violation count criterion during the violation period. The adjusting of the at least one delay status report reporting criterion may comprise decreasing the initial remaining latency budget criterion by the remaining latency step value.

In an embodiment, the at least one delay status report reporting criterion may comprise an initial remaining latency budget criterion and a volume change criterion. The delay status report reporting configuration may further comprise a remaining latency step value applicable to the adjusting of the at least one delay status report reporting criterion. The first characteristic may be a first volume of traffic stored in the memory and the determined first characteristic may be a determined first volume of traffic stored in the memory. The second characteristic may be a second volume of traffic stored in the memory and the determined second characteristic may be a determined second volume of traffic stored in the memory. The analyzing of the determined first characteristic may comprise determining that the determined first volume of traffic corresponds to exceeding the volume change criterion. The adjusting of the at least one delay status report reporting criterion may comprise increasing the initial remaining latency budget criterion by the remaining latency step value.

In an embodiment, the at least one delay status report reporting criterion may comprise an initial remaining latency budget criterion and a volume change criterion. The delay status report reporting configuration may further comprise a remaining latency step value applicable to the adjusting of the at least one delay status report reporting criterion. The first characteristic may be a first volume of traffic stored in the memory and the determined first characteristic may be a determined first volume of traffic stored in the memory. The second characteristic may be a second volume of traffic stored in the memory and the determined second characteristic may be a determined second volume of traffic stored in the memory. The analyzing of the determined first characteristic may comprise determining that the determined first volume of traffic corresponds to failure to exceed the volume change criterion. The adjusting of the at least one delay status report reporting criterion may comprise increasing the initial remaining latency budget criterion by the remaining latency step value.

In an embodiment, the at least one delay status report reporting criterion may comprise an initial remaining latency budget criterion. The at least one adjusted delay status report reporting criterion may comprise an adjusted remaining latency budget criterion. The delay status report reporting configuration may further comprise an adjusted remaining latency budget criterion criterion. The adjusted remaining latency budget criterion criterion may be applicable to determine whether the adjusted remaining latency budget criterion has been adjusted to be more than or less than the adjusted remaining latency budget criterion criterion. The method may further comprise determining, by the user equipment, that the adjusted remaining latency budget criterion fails to satisfy the adjusted remaining latency budget criterion criterion. Based on the determining that the adjusted remaining latency budget criterion fails to satisfy the adjusted remaining latency budget criterion criterion, the method may further comprise resetting, by the user equipment, the adjusted remaining latency budget criterion to the initial remaining latency budget criterion.

In an embodiment, based on the analyzed determined second characteristic being determined by the user equipment to violate the at least one adjusted delay status report reporting criterion, the method may further comprise facilitating, by the user equipment, reporting, to the radio access network node, a delay status report comprising a delay indication corresponding to the second protocol data unit.

In an embodiment, the first protocol data unit and the second protocol data unit may be associated with a logical channel. The at least one delay status report reporting criterion may correspond to the logical channel.

In an embodiment, the first protocol data unit and the second protocol data unit may be associated with a first traffic flow and traffic corresponding to a second traffic flow may be stored in the memory. The at least one delay status report reporting criterion may be at least one first delay status report reporting criterion corresponding to the first traffic flow, and at least one second delay status report reporting criterion may correspond to the second traffic flow.

In another example embodiment, a user equipment may comprise a processor configured to process executable instructions that, when executed by the processor, facilitate performance of operations, comprising receiving, from a radio access network node, a delay status report reporting configuration comprising an initial remaining latency budget criterion. The operations may further comprise determining a first remaining latency budget corresponding to a first packet stored in a memory of the user equipment to result in a determined first remaining latency budget and analyzing the determined first remaining latency budget with respect to the initial remaining latency budget criterion to result in an analyzed determined first remaining latency budget. Based on the analyzed determined first remaining latency budget, the operations may further comprise adjusting the initial remaining latency budget criterion to result in an adjusted remaining latency budget criterion. The operations may further comprise determining a second remaining latency budget corresponding to a second packet stored in the memory to result in a determined second remaining latency budget and analyzing the determined second remaining latency budget with respect to the adjusted remaining latency budget criterion to result in an analyzed determined second remaining latency budget, which may be used as a trigger for transmitting a delay status report to the radio access network node.

In an embodiment, the delay status report reporting configuration may further comprise a latency violation count criterion corresponding to a violation period and a remaining latency step value, associated with the latency violation count criterion, applicable to the adjusting of the initial remaining latency budget criterion. The analyzing of the determined first remaining latency budget may comprise determining that the determined first remaining latency budget is a violation occurrence that corresponds to exceeding the latency violation count criterion during the violation period. The adjusting of the initial remaining latency budget criterion may comprise increasing the initial remaining latency budget criterion by the remaining latency step value.

In an embodiment, the delay status report reporting configuration may further comprise a latency violation count criterion corresponding to a violation period and a remaining latency step value, associated with the latency violation count criterion, applicable to the adjusting of the initial remaining latency budget criterion. The analyzing of the determined first remaining latency budget may comprise determining that the determined first remaining latency budget is a violation occurrence that corresponds to failure to exceed the latency violation count criterion during the violation period. The adjusting of the initial remaining latency budget criterion may comprise decreasing the initial remaining latency budget criterion by the remaining latency step value.

In an embodiment, the delay status report reporting configuration may further comprise a volume change criterion and a remaining latency step value, associated with the volume change criterion, applicable to the adjusting of the initial remaining latency budget criterion. The first packet may correspond to a first volume of traffic stored in the memory. The second packet may correspond to a second volume of traffic stored in the memory. The analyzing of the determined first remaining latency budget may comprise determining that the first volume of traffic corresponds to exceeding the volume change criterion. The adjusting of the initial remaining latency budget criterion may comprise increasing, by the user equipment, the initial remaining latency budget criterion by the remaining latency step value.

In an embodiment, based on the analyzed determined second remaining latency budget being determined to violate the adjusted remaining latency budget criterion, the operations may further comprise reporting, by the user equipment to the radio access network node, a delay status report comprising a delay indication corresponding to the second packet.

In yet another example embodiment, a non-transitory machine-readable medium may comprise executable instructions that, when executed by a processor of a user equipment, facilitate performance of operations, comprising receiving, from a radio access network node, a delay status report reporting configuration comprising an initial remaining latency budget criterion and a volume change criterion. The operations may further comprise determining a first remaining latency budget corresponding to a first packet, corresponding to a traffic flow, stored in a memory of the user equipment to result in a determined first remaining latency budget and determining a first traffic volume, corresponding to the traffic flow, stored in the memory to result in a determined first traffic volume. The operations may further comprise analyzing the determined first remaining latency budget with respect to the initial remaining latency budget criterion and the determined first traffic volume with respect to the volume change criterion to result in an analyzed traffic flow. Based on the analyzed traffic flow, the operations may further comprise adjusting the initial remaining latency budget criterion to result in an adjusted remaining latency budget criterion. The operations may further comprise determining a second remaining latency budget corresponding to a second packet, corresponding to the traffic flow, stored in the memory, to result in a determined second remaining latency budget and analyzing the determined second remaining latency budget with respect to the adjusted remaining latency budget criterion to result in an analyzed determined second remaining latency budget. Based on the analyzed determined second remaining latency budget being determined to violate the adjusted remaining latency budget criterion, the operations may further comprise transmitting, to the radio access network node, a delay status report comprising a delay indication corresponding to the traffic flow.

In an embodiment, the delay status report reporting configuration may further comprise a latency violation count criterion corresponding to a violation period and a remaining latency adjustment step, associated with the latency violation count criterion, applicable to the adjusting of the initial remaining latency budget criterion. The analyzing of the determined first remaining latency budget with respect to the initial remaining latency budget criterion and the determined first traffic volume with respect to the volume change criterion may comprise determining that the determined first remaining latency budget corresponds to violation of the latency violation count criterion during the violation period. The adjusting of the initial remaining latency budget criterion may comprise increasing the initial remaining latency budget criterion by the remaining latency adjustment step.

In an embodiment, the delay status report reporting configuration may further comprise a latency violation count criterion corresponding to a violation period and a remaining latency adjustment step, associated with the latency violation count criterion, applicable to the adjusting of the initial remaining latency budget criterion. The analyzing of the determined first remaining latency budget with respect to the initial remaining latency budget criterion and the determined first traffic volume with respect to the volume change criterion may comprise determining that the determined first remaining latency budget corresponds to failure to violate the latency violation count criterion during the violation period. The adjusting of the initial remaining latency budget criterion may comprise decreasing the initial remaining latency budget criterion by the remaining latency adjustment step.

In an embodiment, the delay status report reporting configuration may further comprise a volume-based adjustment step, associated with the volume change criterion, applicable to the adjusting of the initial remaining latency budget criterion. The analyzing of the determined first remaining latency budget may comprise determining that the first traffic volume corresponds to failure to be less than the volume change criterion. The adjusting of the initial remaining latency budget criterion may comprise increasing the initial remaining latency budget criterion by the volume-based adjustment step.

In an embodiment, the delay status report reporting configuration may further comprise a volume-based adjustment step, associated with the volume change criterion, applicable to the adjusting of the initial remaining latency budget criterion. The analyzing of the determined first remaining latency budget may comprise determining that the first traffic volume corresponds to being less than the volume change criterion. The adjusting of the initial remaining latency budget criterion may comprise decreasing the initial remaining latency budget criterion by the volume-based adjustment step.

DETAILED DESCRIPTION

Figure 1:
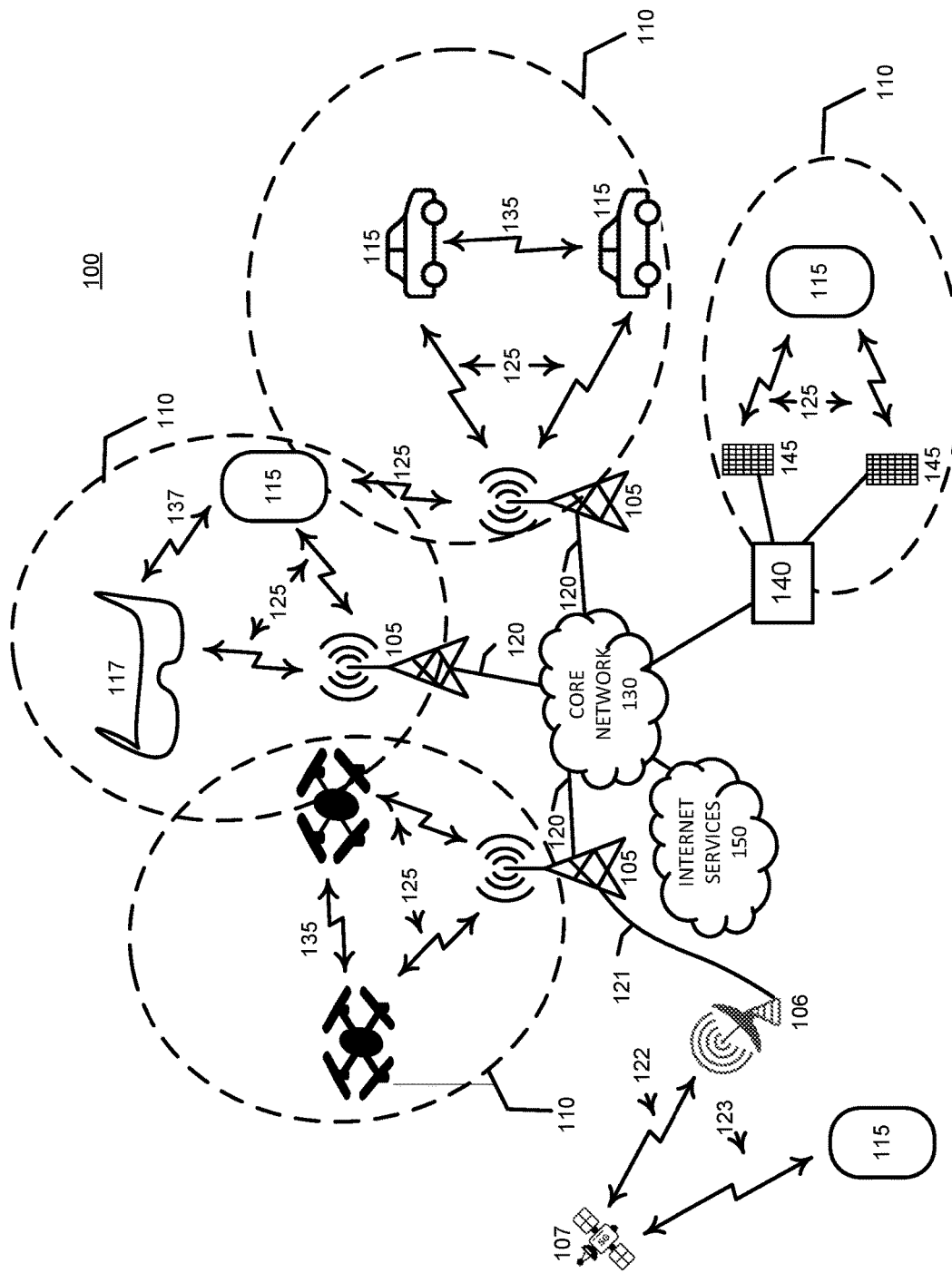
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, laptop computers, tablet computers, automobiles or other vehicles, or drones or other aircraft. Another example of a UE may be a virtual reality/extended reality appliance 117, such as smart glasses, a virtual reality headset, an augmented reality headset, and other similar devices that may provide images, video, audio, touch sensation, taste, or smell sensation to a wearer. A UE, such as XR appliance 117, may transmit or receive wireless signals with a RAN base station 105 via a long-range wireless link 125, or the UE/XR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. XR appliance 117 may also communicate with a wireless UE via a cable, or other wired connection. An XR appliance 117 may offload processing functionality or functionality related to communicating with a RAN, to a user equipment 115, which may be referred to as an intermediate user equipment or an XR processing unit. An XR processing unit or a RAN, or a component thereof, may be implemented by one or more computer components that may be described in reference to FIG. 11. An XR processing unit may also comprise components described in reference to FIG. 12

Continuing with discussion of FIG. 1, base stations 105, which may be referred to as radio access network nodes or cells, may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$)

and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A user equipment device with uplink traffic to be transmitted may transmit an uplink scheduling request ("SR") over an uplink control channel between the user equipment and a radio access network node ("RAN") that is serving the UE after establishing an initial connection with the network RAN. The SR transmission may indicate to the RAN node vital information, such as the availability of uplink traffic at the UE to facilitate the RAN node allocating a set of the available uplink resources that are appropriate to the UE for the uplink traffic to be transmitted therefrom. However, the network/RAN node needs to be aware of the size, or amount, of the uplink traffic to be transmitted by the UE to allocate a suitable amount of uplink resources (e.g., scheduled uplink transmission occasions at a certain periodicity and at a certain frequency or within a certain frequency range). A buffer status report ("BSR") transmitted from the UE to a RAN may convey to the RAN an amount of traffic to be transmitted by the UE.

A BSR report may be transmitted from UE devices towards serving base stations (e.g., RAN nodes), which BSR report may include information indicating a size, or amount, of uplink traffic buffered at devices. Buffer status reporting from UE devices towards serving cells/nodes is important since a BSR report indicates to a serving RAN a size or amount of current buffered uplink traffic at a UE device and accordingly the network can efficiently allocate an appropriate size of uplink resources usable to deliver the uplink traffic transmissions. To reduce BSR reporting overhead, several buffered traffic size ranges may be defined, where each is associated with a BSR integer index. Thus, a UE device may only transmit a BSR index that corresponds to the traffic range within which a size of buffered traffic lies.

To reduce the amount of BSR reporting overhead (e.g., uplink resources used for buffer status reporting instead of being used to transmit actual uplink traffic payload packets), a size, or amount, of buffered uplink traffic may be quantized into several predefined/configured size ranges and/or levels. Thus, a table of predefined BSR size ranges and associated BSR indexes may be defined and configured in UE device, where each BSR index corresponds to a certain BSR range, (e.g., a certain size, or amount, of buffered uplink traffic in terms of bytes, for example).

A problem, however, is the quantization step size between two successive buffered traffic size ranges represented by a BSR index. Step sizes may be predefined and hard coded in fixed BSR tables that are broadcasted to all UE devices wherein the step size is non-uniform. That is, a smaller fixed step size may be used for smaller buffered traffic ranges and a larger step size may be used for the larger traffic ranges. For instance, a single BSR index can indicate a buffered traffic range from 240 k bytes to 300 k bytes.

Spacing between the different quantization levels is typically non-uniform and is predefined, for example, a small quantization step size is used for ranges of smaller amounts of buffered uplink traffic and a larger step size may be used for ranges of larger amounts of buffered uplink traffic. Accordingly, conventional BSR reporting only includes an index from the table that corresponds to the current size of uplink traffic, which typically leads to a reduction in reporting overhead since an index value may comprise fewer bytes to be transmitted in an uplink reporting message than a number of bytes that may be used to transmit a value of an actual size of buffered uplink traffic.

Delay Status Reporting

A Delay Status Report ("DSR") is a 5G feature to facilitate operation of fifth-generation mobile networks. 5G DSR reporting may facilitate reporting of information monitored or determined by a user equipment that may correspond to latency and delay associated within a network. A DSR may facilitate providing of real-time updates corresponding to, or indicative of, statuses of data transmission, network performance, and potential bottlenecks that may lead to latency budget violations.

Uses of DSR reporting in 5G may comprise reporting of latency metrics, including round-trip delay, one-way delay, and jitter, to assess network performance with respect to a radio access network node. A DSR report may comprise information corresponding to end-to-end latency from a user equipment, through a radio access network node and core network, to a destination, thus facilitating end-to-end performance visibility. DSR reporting may facilitate a RAN node allocating resources to facilitate satisfying QoS requirements for latency-sensitive application traffic.

Existing buffer status reporting and delay status reporting procedures comprise transmitting reports based on static traffic volume and static delay thresholds. For example, transmitting of a DSR may be triggered by a user equipment device determining that a remaining latency budget ("RLB") corresponding to a buffered packet (e.g., time remaining before a target maximum delay budget limit $t_B$ corresponding to the packet is violated) falls below a preconfigured static threshold. Triggering reporting of a DSR upon a RLB being less than a configured criterion may reduce control uplink signalling overhead by reducing occurrences of DSR or BSR reports being triggered. However, using a static threshold may lead to significant degradation of QoS observed by a user. For example, when congestion of uplink resources occurs, a user equipment device may trigger a DSR report based on a predefined and preconfigured latency threshold. However, transmission of the DSR may not occur with sufficient time for a serving RAN node to schedule uplink resource. A static threshold may be acceptable during periods of network non-congestion or low congestion, but when network congestion increases or a condition of resource starvation exists, a static threshold may not facilitate DSR reporting that facilitates enough time for a RAN node to schedule resources such that delivery of traffic according to a QoS requirement associated with the traffic is satisfied. Thus, use of a static threshold for triggering DSR reporting may result in violation of a target delay budget corresponding to a traffic flow despite a user equipment triggering DSR reporting according to the static threshold.

According to an embodiment disclosed herein, upon determining a potential uplink resource congestion or starvation condition, based on a remaining latency budget violating a remaining latency budget criterion (e.g., a remaining latency budget corresponding to a packet is less than a remaining latency budget criterion), a user equipment device may compile and transmit a DSR corresponding to a later-buffered packet according to an adjusted remaining latency budget criterion earlier, with respect to a RLB corresponding to the packet, than if the criterion had not been adjusted, to facilitate more time for a serving RAN node to schedule resources for traffic buffered by the user equipment.

Dynamic Reporting of Packet Delay Status Information.

According to embodiments disclosed herein, a user equipment device may receive an adaptive delay status reporting configurations, which may be referred to as a delay status report reporting configuration and which may include a minimum initial remaining latency budget threshold for triggering DSR reporting. The delay status report reporting configuration may comprise a congestion-specific increment/decrement step, or value, applicable to the minimum initial remaining latency budget criterion/threshold when transmission of a packet corresponds to a remaining latency budget that violates the initial remaining latency budget criterion/threshold. The delay status report reporting configuration may comprise a minimum or a maximum number criterion usable for analysis of packet latency violations (e.g., a remaining latency budget is less than the initial remaining latency budget threshold) inflicted, or occurring, during a configured period. A delay status report reporting configuration may comprise a traffic-volume-specific increment/decrement step, or value, applicable to a current remaining latency budget criterion, and respective positive or negative change criteria, which may be thresholds in terms of percentage of traffic volume change or in terms of amount of traffic volume change, usable to analyze a volume of traffic buffered in the user equipment.

Initially, a user equipment device may trigger transmitting of a DSR report based on the configured initial remaining latency budget criterion being violated by transmission of a packet with a remaining latency budget that is less than the initial remaining latency budget criterion. That is, a DSR may be transmitted/reported when a buffered packet inflicts certain buffering delay (inside the device's buffer(s)) that result in a remaining latency budget corresponding to the packet falling lower than the configured remaining latency budget criterion, even though the ultimate latency budget corresponding to the packet may not be violated. On condition of determining a number of remaining latency budget criterion violations, corresponding to previously buffered packets, within a preconfigured period of time that exceed a configured maximum number of allowable violations (e.g., a latency violation count criterion) or that fall below a configured minimum number of violations during a preconfigured period of time, the user equipment device may increase or decrease a current remaining latency budget criterion by the congestion-specific step value. On condition of determining an increase of buffered traffic volume that exceeds a maximum configured positive change percent/amount criterion or determining that a decrease in buffered traffic falls below a negative change threshold, the user equipment device may increase or decrease, respectively, a current remaining latency threshold by the second traffic-volume-specific step.

The adaptation, or application, of the congestion-related step to the remaining latency budget criterion may facilitate a user equipment device triggering DSR reporting earlier with respect to pendency of a packet in a buffer than would be the case if the remaining latency budget criterion were not adjusted, which adjustment may be reflective of network uplink resource congestion or starvation, thus allowing more time for a RAN node serving the user equipment to schedule sufficient resources for transmitting uplink traffic from the user equipment to the RAN node. However, adaptation, or application, of the traffic volume step of the remaining latency threshold may facilitate a user equipment device dynamically fine-tuning triggering of DSR reporting based on how much traffic is being generated or currently buffered by the user equipment device. Thus, unexpected, or unpredicted, increases in traffic volume (e.g., traffic that is sporadic in nature) may trigger generating and transmitting, by the user equipment, a DSR earlier than if the current remaining latency budget criterion had not been adjusted by the traffic volume step value to facilitate the RAN node scheduling resource instances usable by the user equipment to transmit the sporadic increase in buffered traffic.

On condition of a current remaining latency budget criterion exceeding a maximum bound or falling below the minimum bound, which bound(s) may be referred to as an adjusted remaining latency budget criterion criterion(s) (e.g., a criterion for determining that the initial remaining latency budget criterion has been adjusted to a value that falls outside a range specified by the criterion criterion), a user equipment may reset an adjusted remaining latency budget criterion to the initial remaining latency budget criterion.

Thus, unlike convention DSR reporting techniques wherein DRS reporting is triggered based on fixed thresholds, which disregard the time-variant nature of buffered traffic volume and resource congestion/starvation, according to embodiments disclosed herein, scheduling efficiency corresponding to scheduling of overhead resources used for delivery of DSR reporting may be based on time-variant traffic volume and network congestion conditions/states, such that potentially stringent packet latency budgets are satisfied network resource congestion/starvation is elevated and scheduling efficiency is increased during periods of reduced resource congestion/starvation. According to embodiments disclosed herein, user equipment devices may dynamically, on a time-variant basis, determine when to trigger DSR reporting that corresponds to current traffic volume or network resource congestion conditions.

Figure 2:
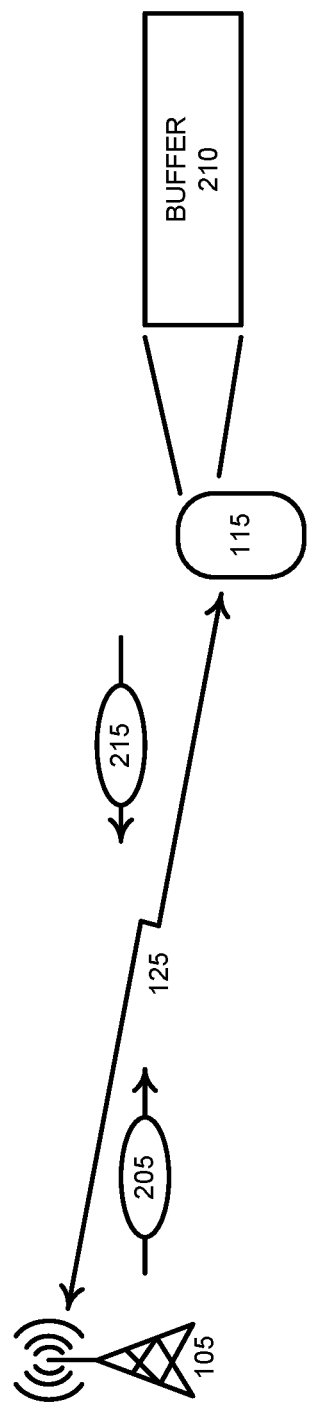
FIG. 2 illustrates an example environment.

Turning now to FIG. 2, the figure illustrates an example environment 200 with user equipment 115, comprising buffer 210, in communication with radio access network node 105. Radio access network node 105 may transmit to user equipment 115 a delay status report reporting configuration 205 comprising configuration information usable by the user equipment to adjust a remaining delay budget criterion, which may be an initial remaining delay budget criterion configured via configuration 205 or an adjusted remaining delay budget criterion. An adjusted remaining delay budget criterion may result from analysis of a packet buffered in buffer 210. User equipment 115 may trigger generating and transmitting to node 105 delay status report 215, with respect to one or more packets buffered in the future, based on an adjusted remaining delay budget criterion.

Figure 3:
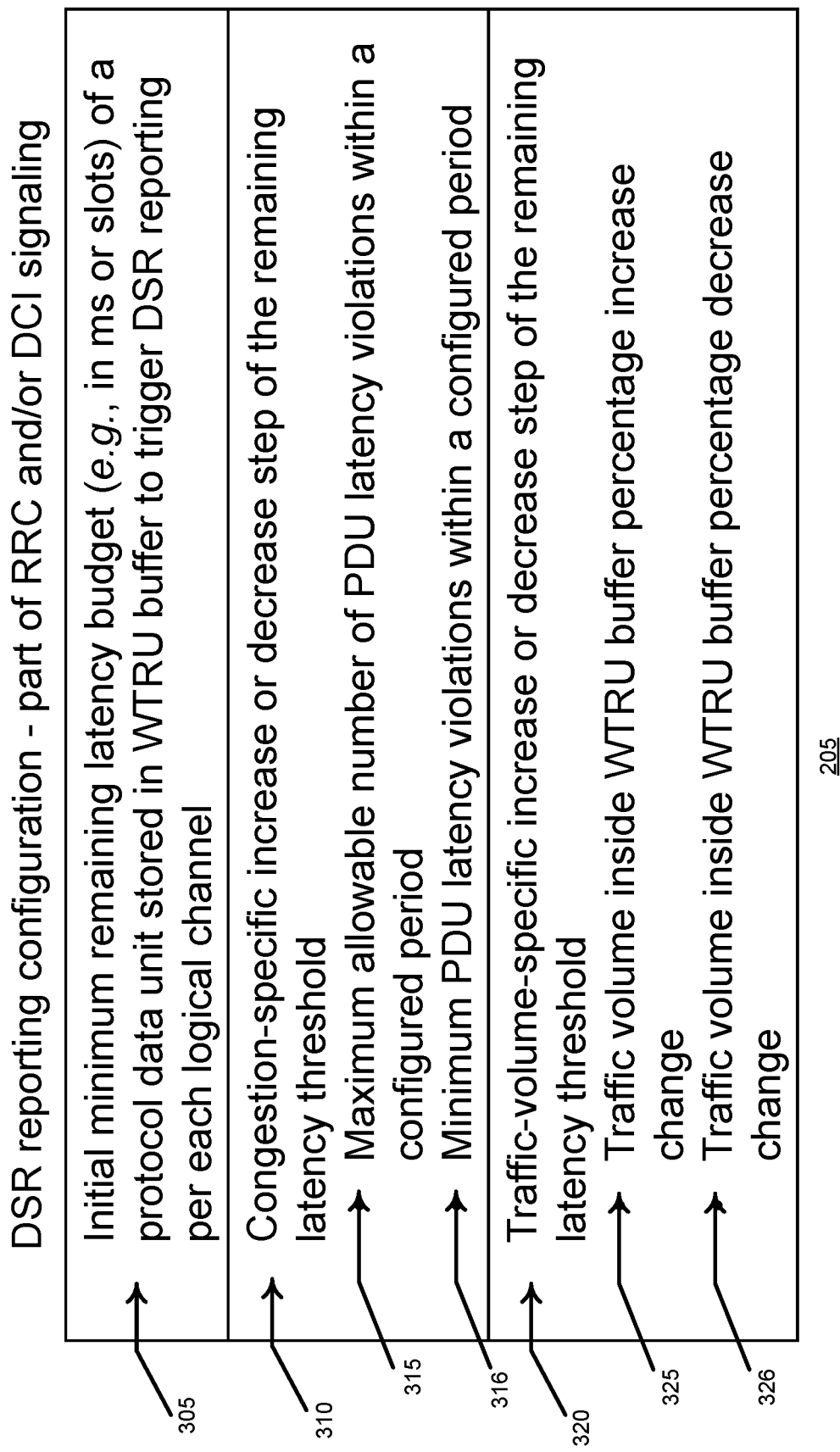
FIG. 3 illustrates an example delay status report reporting configuration.

Turning now to FIG. 3, the figure illustrates an example delay status report reporting configuration 205, or information contained therein, that may be received by a user equipment 115 as shown in FIG. 2. The configuration information contained in configuration 205 may comprise minimum initial remaining latency threshold 305, which may be referred to as an initial remaining budget latency criterion. Criterion 305 may facilitate triggering of DSR reporting. Configuration 205 may comprise first congestion-specific increment/decrement step 310 that may be applicable to criterion 305 to adjust, up or down, (e.g., increase, or decrease) the initial remaining budget latency criterion based on criticality of a packet, corresponding to a traffic flow, buffered by a user equipment (e.g., adjustment maybe made based on how much time remains before the packet has been buffered in the buffer in violation of the initial remaining budget latency criterion). Congestion-specific increment/decrement step 310 may be applied to remaining latency budget criterion 305 (or to an adjusted remaining latency budget criterion) to result in an adjusted remaining latency budget criterion if a resource, scheduled by a radio access network node to carry the packet, is not scheduled to occur until after the packet has been buffered in a buffer of a user equipment beyond a time corresponding to violation of the initial remaining budget latency criterion. A user equipment configured with configuration information 205 may be configured with count criterion 315, which may be referred to as a latency violation count criterion. Congestion-specific increment/decrement step 310 may be applied to criterion 305 based on a number of remaining latency threshold violations, occurring during a configured period, exceeding, or being equal to, count criterion 315 or failing to exceed, or being equal to, minimum count criterion 316. Congestion-specific increment/decrement step 310 may be referred to as a remaining latency step value.

Configuration information 205 may comprise traffic-volume-specific increment/decrement step 320, that may comprise, or indicate, a value that may be applied to initial remaining latency budget criterion 305 (or to an adjusted remaining latency budget criterion), based on a volume of traffic stored in a buffer of a user equipment exceeding, or being equal to, configured maximum volume change criterion 325, or failing to exceed, or being equal to, minimum volume change criterion 326. Criterion 325 or criterion 326 may be percent change values or size values (e.g., in terms of bytes).

Figure 4A:
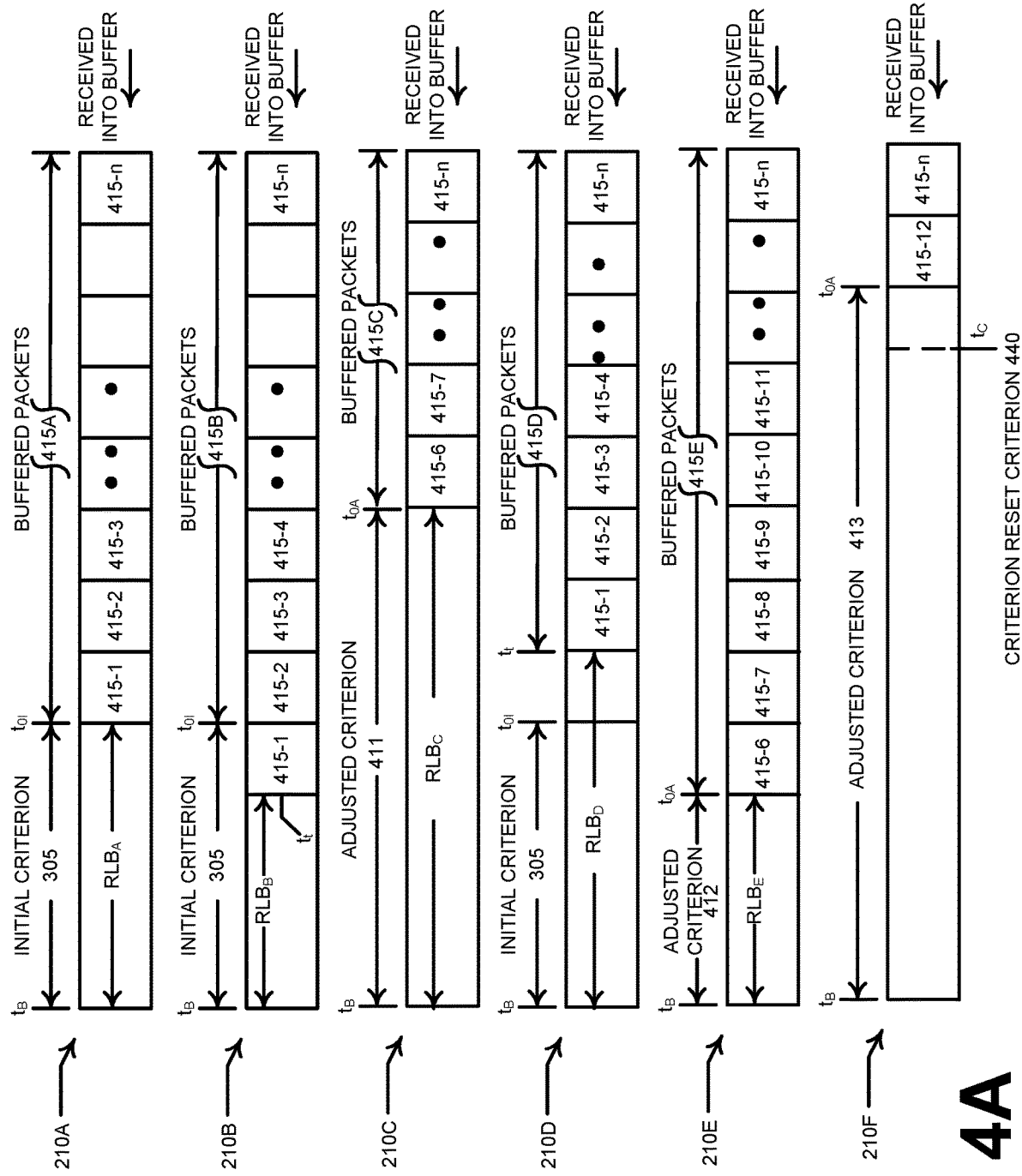
FIG. 4A illustrates example user equipment buffer remaining delay budget criteria adjusted in response to latency budget violations.

Turning now to FIG. 4A, the figure illustrates examples of traffic protocol data units, or packets, stored, or buffered, in a memory, or buffer, 210, of a user equipment, such as user equipment 115 shown in FIG. 2. In FIG. 4A, snapshot 210A of buffer 210 shows packets 415-1 through 415-$n$ being stored in the buffer wherein an RLB with respect to packet 415-1 has not violated initial remaining latency budget criterion 305 as indicated by the packet being shown to the right of time $t_{0I}$. Time $t_B$ may indicate a time by which packet 415-1 should be transmitted to a serving radio access network node to facilitate satisfaction of a quality-of-service corresponding to a traffic flow associated with packet 415-1. Even though a packet of packets 415A may be transmitted before time $t_B$ (e.g., an RLB corresponding to the packet is a positive value), a delay status report may be transmitted by a user equipment comprising buffer 210 if the packet is transmitted to the serving radio access network node before $t_B$ but after time $t_0$ (e.g., there is a positive RLB with respect to the packet but the packet is not transmitted before the RLB becomes less than configured remaining latency budget criterion 305).

As shown in snapshot 210B, although a quality-of-service criterion corresponding to packets 415B may not have been violated because packet 415-1 is transmitted at time $t_t$ (e.g., transmission time) before $t_B$, transmission of packet 415-1 may trigger transmitting of a delay status report by a user equipment comprising buffer 210 to a serving radio access network node because time $t_t$ occurs after $t_{0I}$ (e.g., $RLB_B$ is less than initial remaining latency budget criterion 305 and thus the initial remaining latency budget criterion is violated, or not satisfied). Accordingly, a user equipment comprising buffer 210 may determine to increase initial remaining latency budget criterion 305 to result in an adjusted remaining latency budget criterion 411 as shown in snapshot 210C.

A determination to increase (or decrease) a remaining latency budget criterion, whether an initial remaining latency budget criterion or an adjusted remaining latency budget criterion, may not occur after a first determination that a packet stored in buffer 210 has violated the initial, or adjusted, criterion. In an embodiment, the user equipment may determine a number of times, or a count, of violations of a remaining latency budget criterion before determining to adjust, either upwardly or downwardly, a current remaining latency budget criterion (e.g., current meaning either an initial remaining latency budget criterion or an adjusted remaining latency budget criterion). Thus, after a configured number of violations of a remaining latency budget criterion has been determined to have occurred (e.g., a number of times an RLB being less than a current remaining latency budget criterion has equaled or exceeded a configured latency violation count criterion during a violation period), the user equipment may adjust the current latency budget criterion.

In snapshot 210C, adjusted remaining latency budget criterion 411 is shown as having been increased from initial remaining latency budget criterion 305 due to packet 415-1 being transmitted at time $t_t$, which does not occur before $t_{0I}$ shown in snapshot 210B. The user equipment comprising buffer 210 may have analyzed the count, or number, of violations of remaining latency budget criterion 305 shown in snapshot 210B with respect to a configured maximum allowable number of latency violation occurrences (e.g., latency violation count criterion 315 shown in FIG. 3) to determine to adjust, or increase, criterion 305 shown in snapshot 210B to result in adjusted criterion 411 shown in snapshot 210C. Packet 415-6 is shown in snapshot 210C with $RLB_C$ not violating adjusted criterion 411.

In another example, snapshot 210D shows transmission at time $t_t$ of packet 415-1 before time $t_{0I}$. If transmission at time $t_t$ of packet 415-1 is an occurrence of an RLB being greater than a current remaining latency budget criterion (e.g., $RLB_D$ is greater than, or longer than, initial criterion 305) and corresponds to a number/count of an RLB associated with a packet exceeding a current remaining latency budget criterion being less than a configured minimum count value (e.g., latency violation count criterion 316 shown in FIG. 3) during a configured violation period, a user equipment comprising buffer 210 may decrease, or shorten, initial remaining latency budget criterion 305 to result in adjusted remaining latency budget criterion 412 shown in snapshot 210E. Packet 415-6 is shown in snapshot 210E with $RLB_E$ not violating adjusted criterion 412.

Increasing a remaining latency budget criterion to result in an increased adjusted remaining latency budget criterion 411 as shown in snapshot 210C may result in more frequent occurrences of an RLB being less than a current remaining latency budget criterion thus resulting in more frequent transmission of delay status reports by a user equipment comprising buffer 210. However, an increased remaining latency budget criterion may result in an increased likelihood that a delay status report is transmitted to a serving radio access network node with enough time to be received by the serving radio access network node, for the radio access network node to schedule resources usable by the user equipment to transmit packet 415-6 or 415-7, for the radio access network node to transmit a resources grant to the user equipment, and for the user equipment to transmit packet 415-6 or 415-7 such that the packet is transmitted by time $t_B$ corresponding to the packet. Thus, increasing a remaining latency budget criterion may facilitate satisfying a quality-of-service requirement corresponding to traffic flow associated with packets 415-6 or 415-7, but more control channel resource overhead may be used to transmit delay status reports more frequently than if the remaining latency budget criterion had not been increased. On the other hand, if a user equipment comprising buffer 210 experiences fewer occurrences of packet transmissions corresponding to RLBs respectively associated with the packets violating a remaining latency budget criterion (initial or adjusted), the user equipment may transmit fewer delay status reports to the serving radio access network node by decreasing a remaining latency budget criterion (initial or adjusted), for example as shown in snapshot 210E, due to a lower likelihood that a packet will be transmitted at a time that corresponds to violation of a remaining latency budget criterion. Decreasing a remaining latency budget criterion to result in a likely concomitant reduction in frequency of transmission of delay status reports may result in less control channel overhead resources being used while a likelihood remains high that the packet is transmitted before a corresponding time $t_B$, which may correspond to satisfaction of a quality-of-service requirement corresponding to a traffic flow associated with the packet.

In an embodiment shown in snapshot 210F, a remaining latency budget criterion may have been adjusted multiple times such that an adjusted remaining latency budget criterion 413 corresponds to an increase in a remaining latency budget criterion beyond a configured remaining latency budget criterion criterion $t_c$ 440. For example, an adjusted remaining latency budget criterion 413 may have been increased such that $t_{0,4}$-$t_B$ is greater than $t_C$-$t_B$. If an adjusted remaining latency budget criterion has been increased such that the adjusted criterion exceeds a corresponding criterion criterion (e.g., a criterion applicable to analysis of another criterion), which may be referred to as a reset criterion, the remaining latency budget criterion may be reset to a value, such as, for example, an initial remaining latency budget criterion. It will be appreciated that snapshot 210F illustrates a scenario wherein an adjusted remaining latency budget has been increased such that adjusted criterion 413 extends beyond bound $t_c$, criterion criterion 440, but an adjusted criterion, for example adjusted criterion 412 shown in snapshot 210E, may be decreased such that a minimum criterion criterion is exceeded (e.g., an adjusted criterion may be reduced to a smaller value than a minimum criterion criterion, which is not shown in FIG. 4A). Although reducing a remaining latency budget criterion tends to decrease network overhead resources used to transmit delay status reports, reducing a remaining latency budget criterion may also tend to increase the likelihood of a quality-of-service violation occurring with respect to a traffic flow during periods of network congestion due to reduced frequency of delay status reports. Thus, resetting an adjusted remaining latency budget criterion to an initial remaining latency budget criterion as configured via configuration 205, or resetting to a different value, may be desirable if an adjusted remaining latency budget criterion has been adjusted beyond bounds configured via configuration 205.

Figure 4B:
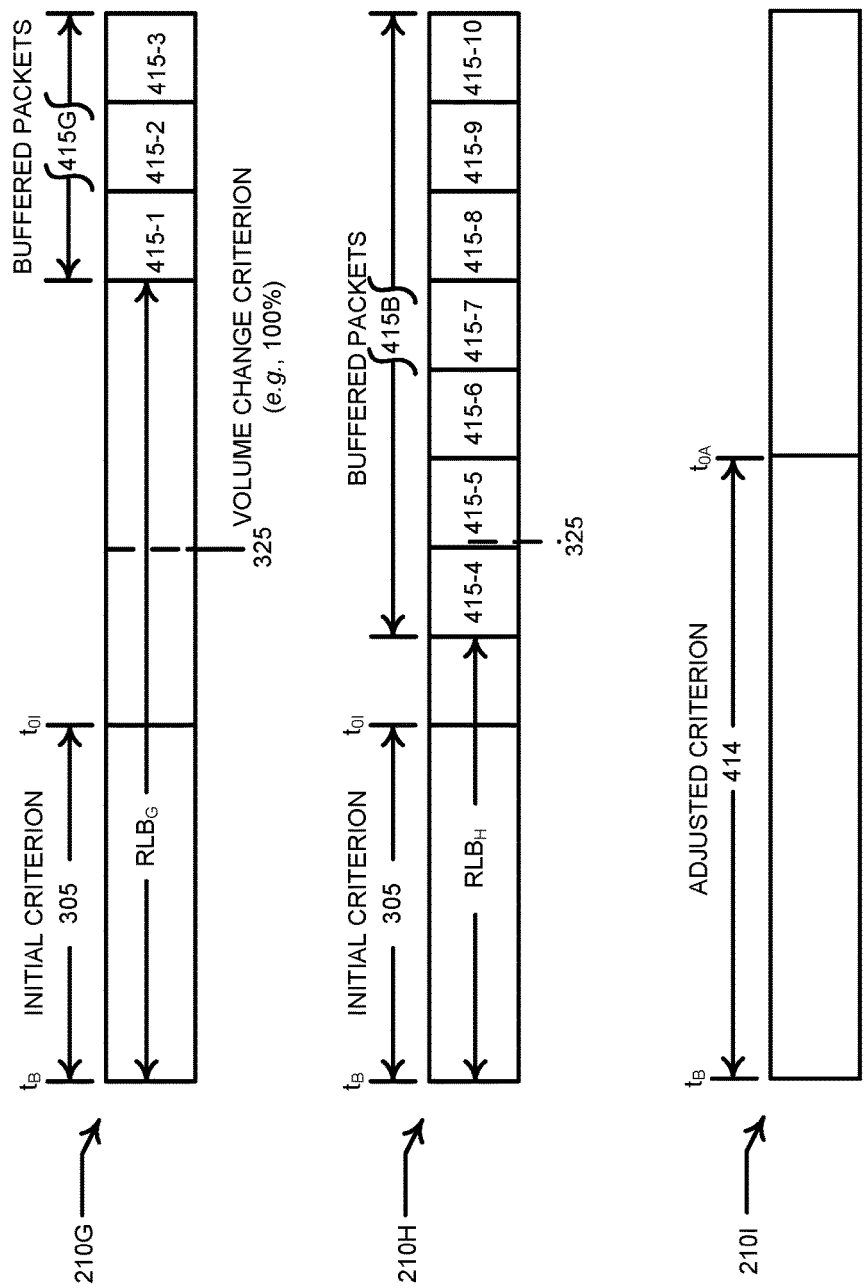
FIG. 4B illustrates example user equipment buffer remaining delay budget criteria adjusted in response to buffered traffic volume changes.

Turning now to FIG. 4B, an embodiment is illustrated wherein adjustment may be made to initial remaining latency budget criterion 305, or to a previously adjusted remaining latency budget criterion (either the initial criterion or adjusted criterion may be referred to as a current criterion), based on a change in an amount, or volume, of traffic stored in a buffer of a user equipment even if a packet stored in the buffer traffic does not correspond to a violation of a current remaining latency budget criterion. For example, snapshot 210G shows packets 415-1, 415-2, and 415-3 stored in buffer 210. In the example shown, volume change criterion 450 may correspond to a 100 percent change in volume. Packet 415-1 is not on the verge of not being transmitted by time $t_{0I}$ corresponding to initial remaining latency budget criterion 305 (e.g., $RLB_G$-$t_{0I}$ corresponds to enough time for packet 415-1 to be transmitted before the initial remaining latency budget criterion is violated). Similarly, as shown in snapshot 210H, packet 415-4 can still be transmitted before time $t_{0I}$, which would correspond to non-violation of initial remaining latency budget criterion 305. However, as shown in snapshot 210H, seven packets 415-4 through 415-10 are stored in buffer 210 whereas in snapshot 210G only three packets 415-1 through 415-3 are stored in the buffer. Because seven packets stored in buffer 210 corresponds to more than the configured 100 percent volume change criterion (e.g., criterion 325 shown in FIG. 3), initial remaining latency budget criterion 305 may be increased to result in adjusted remaining latency budget criterion 414 as shown in snapshot 210I even though initial remaining latency budget criterion 305 was not violated as shown in snapshot 210H. Thus, even though initial remaining latency budget criterion 305 has not been violated as shown in snapshot 210H, based on an increase in volume of packets stored in buffer 210 exceeding configured volume change criterion 325 a corresponding increased likelihood of delay status report reporting may exist due to potentially more traffic being buffered for transmission in buffer 210 and thus an increased likelihood of a latency budget corresponding to a packet being violated (e.g., an RLB corresponding to the packet being zero or negative by the time the packet is transmitted). Accordingly, adjusted remaining latency budget criterion 414 may facilitate smooth delivery of traffic packets buffered in buffer 210 even though configured initial remaining latency budget criterion 305 has not been violated. It will be appreciated that snapshot 210I illustrates an increased remaining latency budget criterion but if a volume of packets buffered in a buffer decreases more than a configured volume change criterion (e.g., criterion 326 shown in FIG. 3), a current remaining latency budget criterion, which may be an initial remaining latency budget criterion or a previously adjusted remaining latency budget criterion, may be reduced to reduce the likelihood of transmitting a delay status report and thus reduce the use of control channel resource usage.

Figure 5:
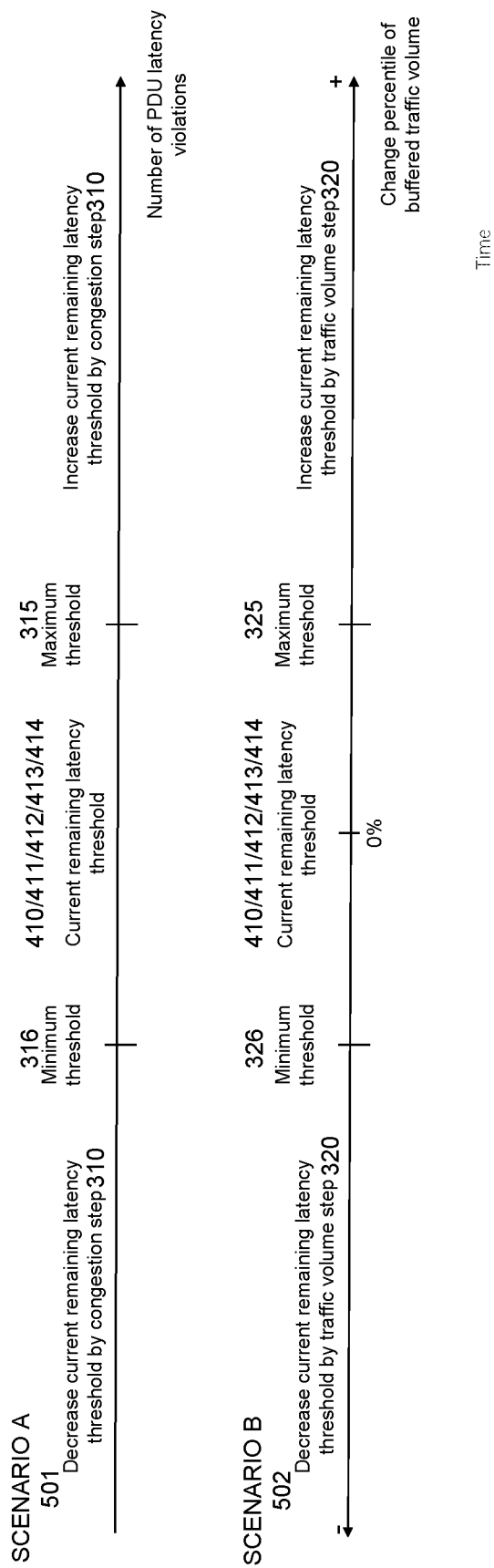
FIG. 5 illustrates example determinations of adjustments to a delay status report reporting criterion.

Turning now to FIG. 5, the figure illustrates examples of adjusting a delay status report reporting criterion based on analysis of one or more characteristics corresponding to the buffer. Scenario A 501 illustrates a continuum of a number of packets not being transmitted in satisfaction of a current remaining latency budget criterion (e.g., a RLB of a packet is less than a remaining latency budget criterion), such as, for example, one of criterion 410, 411, 412, 413, or 414 described in reference to FIG. 4A or FIG. 4B. If more violations of a current remaining latency budget criterion occur than a configured maximum number (e.g., latency violation count criterion 315 described in reference to FIG. 3), a current remaining latency budget criterion may be increased. If fewer violations of a current remaining latency budget criterion occur than a configured minimum number (e.g., latency violation count criterion 316 described in reference to FIG. 3), the current remaining latency budget criterion may be decreased. It will be appreciated that a number of violations of a current remaining latency budget criterion may be determined during a configured latency violation count determining period, which may be configured via configuration 205 described in reference to FIG. 2.

Scenario B 502 illustrates a graph of volume change of buffered traffic from one configured point in time to another configured point in time, or from one configured buffered traffic determining period to another. If a volume of buffered traffic changes from one measurement time or period to another more than a configured maximum volume change criterion, such as value 325 described in reference to FIG. 3, a current remaining latency budget criterion (e.g., a criterion 410, 411, 412, 413, or 414 described in reference to FIG. 4A or FIG. 4B) may be increased. If a volume of buffered traffic decreases, from one measurement time or period to another, more than a configured negative volume change criterion, such as value 326 shown in FIG. 3, a current remaining latency budget criterion may be decreased. It will be appreciated that a buffered traffic volume change may be determined during a configured volume determining period, which may be configured via configuration 205 described in reference to FIG. 2.

Figure 6:
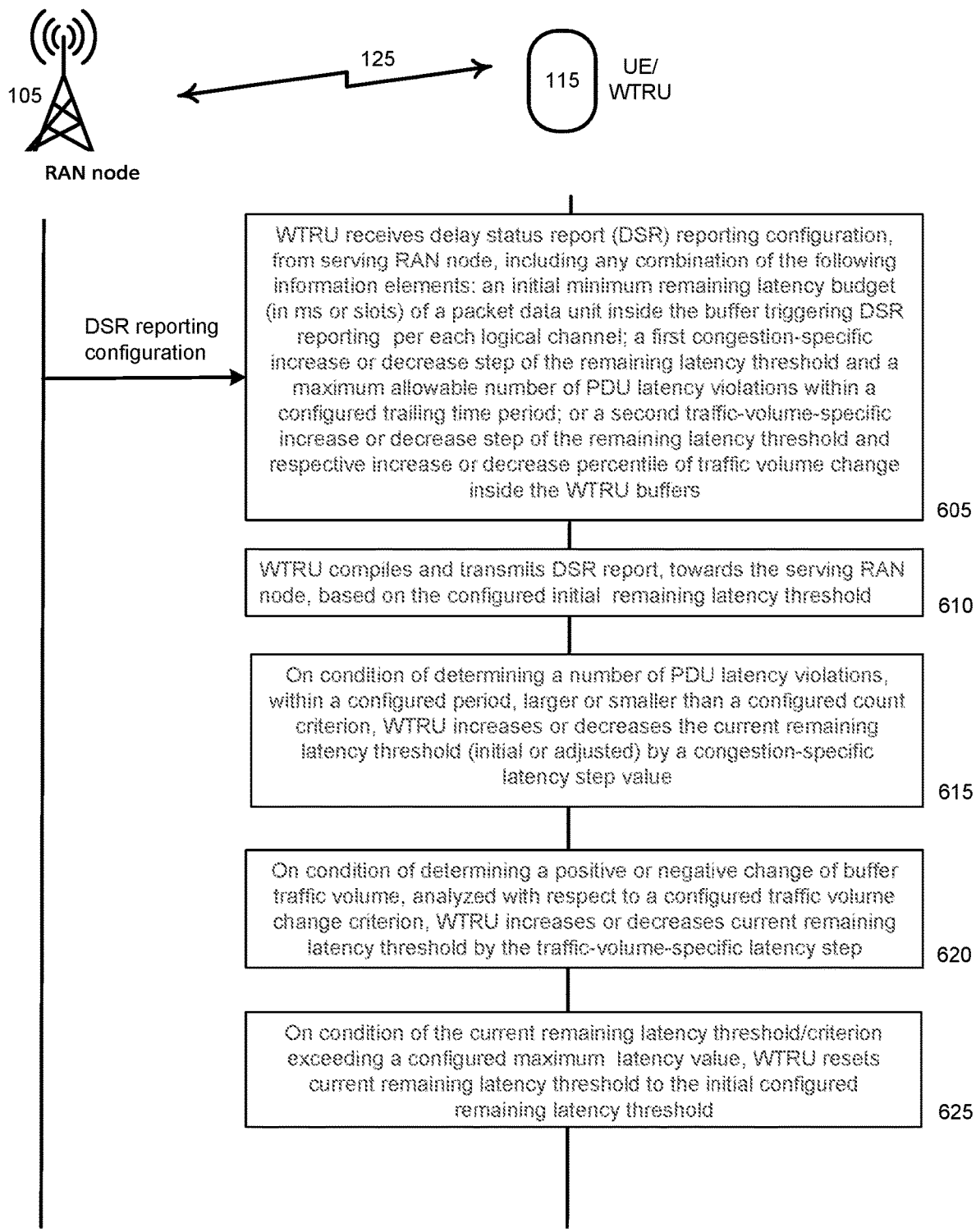
FIG. 6 illustrates timing diagram of an example embodiment of adjusting a delay status report reporting criterion.

Turning now to FIG. 6, the figure illustrates a timing diagram of an example embodiment method 600 to facilitate adjusting a delay status report reporting criterion to facilitate reporting of a delay status report by user equipment 115 to radio access network node 105. At act 605, user equipment 115 may receive a delay status report reporting configuration, such as configuration 205 described in reference to FIG. 2, from serving RAN node 105. The delay status report reporting configuration may comprise an initial minimum remaining latency budget criterion (e.g., in terms of ms or slots) applicable to a packet stored in a memory, or buffer, of user equipment 115. The initial minimum remaining latency budget criterion may facilitate triggering DSR reporting per each logical channel (e.g., each traffic flow that corresponding to packets stored in the buffer). The delay status report reporting configuration may comprise a congestion-specific increase or decrease step value (e.g., step value 310 described in reference to FIG. 3) applicable to the initial (or an adjusted) remaining latency budget criterion, a maximum allowable number of packet latency violations 315, and a minimum allowable number of packet latency violations 316 that may occur during a configured latency violation count determining period. The delay status report reporting configuration may comprise a traffic-volume-specific increase or decrease step value (e.g., value 320 described in reference to FIG. 3) applicable to an initial, or adjusted, remaining latency budget criterion based on violation of traffic volume increase criterion 325 or traffic volume decrease criterion 326 corresponding to change of traffic volume stored in a buffer of UE 115.

At act 610, UE/WTRU 115 may determine and transmit a DSR report towards serving RAN node 105 based on transmission of one or more packets buffered by UE 115 violating a configured initial (or adjusted) remaining latency threshold. At act 615, on condition of determining a number packet transmission latency violations, within the configured latency violation count determining period, larger or smaller than the configured maximum allowable number of packet latency violations or the minimum allowable number of packet latency violations, respectively, UE/WTRU 115 may increase or decrease, respectively, a current remaining latency budget criterion by the configured congestion-specific latency step value 310, to result in an adjusted remaining latency budget criterion, which may be referred to as a current remaining latency budget criterion.

At act 620, on condition of determining a positive or negative change of buffer traffic volume (which determination may be determined independently of the determination of a number packet transmission latency violations made at act 610), UE 115, upon determining that a configured traffic volume change criterion has been violated, may increase or decrease a current remaining latency budget by the traffic-specific latency step value 320, to result in an adjusted remaining latency budget criterion, which may be referred to as a current remaining latency budget criterion. At act 625, on condition of determining that the current remaining latency budget criterion exceeds a maximum or is less than a minimum configured criterion criterion, UE/WTRU 115 may reset the current remaining latency budget criterion to the configured initial remaining latency budget criterion.

Figure 7A:
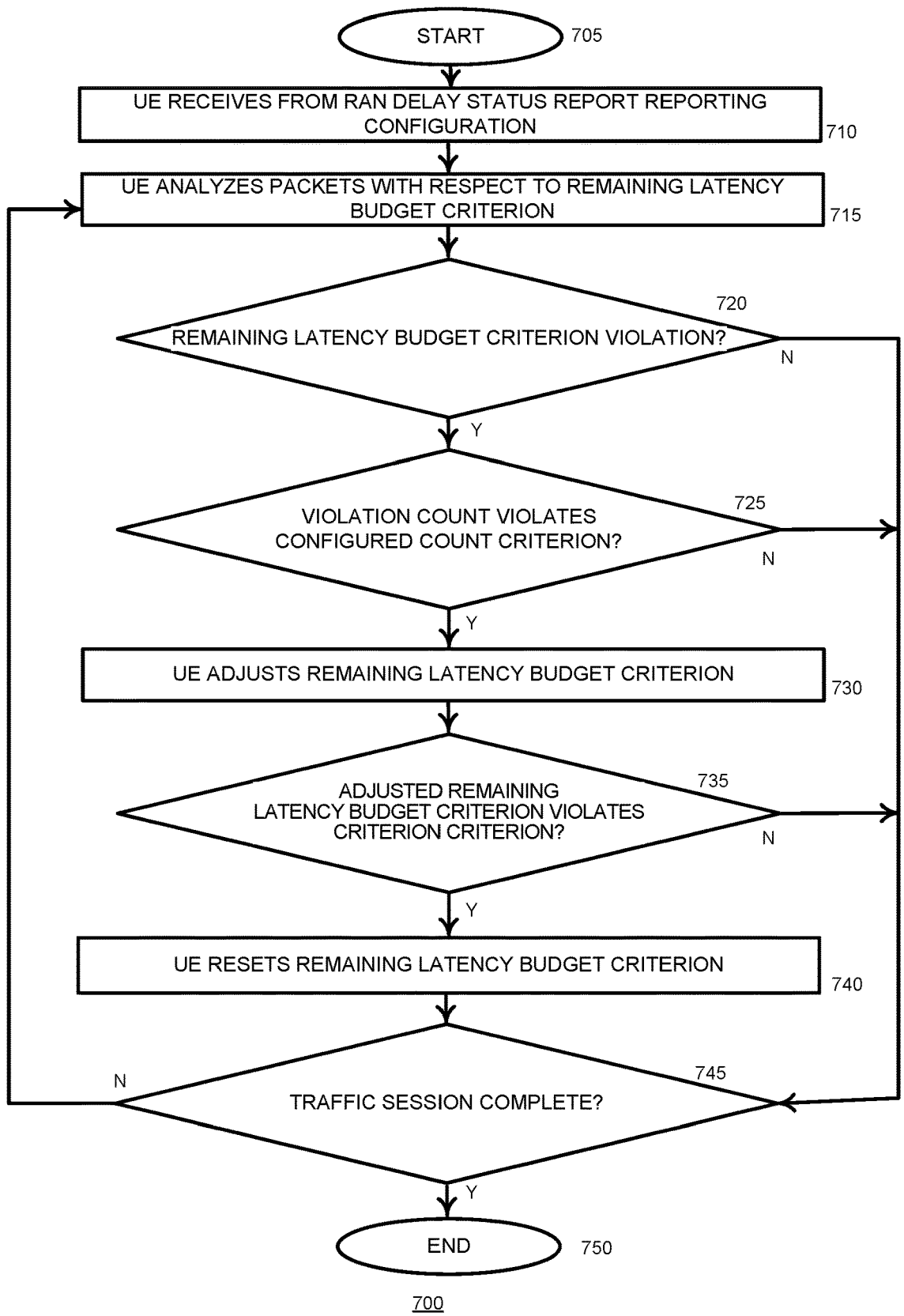
FIG. 7A illustrates a flow diagram of an example embodiment method of dynamically adjusting a remaining latency budget criterion based on violation of the remaining latency budget criterion.

Turning now to FIG. 7A, the figure illustrates a flow diagram of an example embodiment method 700. Method 700 begins at act 705. At act 710, a user equipment may receive from a serving radio access network node a delay status report reporting configuration. The reporting configuration may comprise at least one remaining latency budget criterion. The at least one remaining latency budget criterion may be an initial remaining latency budget criterion. A remaining latency budget criterion may be a minimum remaining latency budget criterion. The reporting configuration may comprise a congestion-related step value that the user equipment may apply to an initial remaining latency budget criterion, or a previously adjusted remaining latency budget criterion, to result in an adjusted remaining latency budget criterion.

At act 715, the user equipment may analyze one or more packets stored in a buffer of the user equipment with respect to a remaining latency budget criterion, which may be an initial remaining latency budget criterion or a previously adjusted remaining latency budget criterion. If the user equipment determines at act 720 that a packet analyzed at act 715 with respect to a remaining latency budget criterion corresponds to a remaining latency budget that does not violate the current remaining latency budget criterion, which may be the initial remaining latency budget criterion or a previously adjusted latency budget criterion, method 700 may advance to act 745. If the user equipment determines at act 720 that a packet analyzed at act 715 corresponds to a remaining latency budget that violates the current remaining latency budget criterion, the user equipment may increment a remaining latency budget criterion violation count before method 700 advances to act 725. At act 725, the user equipment may determine whether a remaining latency budget criterion violation count corresponding to a number of remaining latency budget criterion violations determined within a configured violation period at act 720 violates a remaining latency violation count criterion, which may be referred to as a latency violation count criterion. If a determination is made at act 725 that the remaining latency budget criterion violation count does not exceed, or violate, the remaining latency violation count criterion, method 700 may advance to act 745.

If the user equipment determines at act 725 that the remaining latency budget criterion violation count exceeds, or violates, the remaining latency violation count criterion, method 700 advances to act 730. At act 730, the user equipment may adjust the current remaining latency budget criterion, either initial or adjusted, by the congestion-related step value. For example, if the remaining latency budget criterion violation count exceeds, or is equal to, the remaining latency violation count criterion, an adjustment made at act 730 may be to increase a current remaining latency budget criterion. In an embodiment, if the remaining latency budget criterion violation count is less than, or equal to, a remaining latency violation count criterion, which may correspond to remaining latency budget criterion violations determined during a violation period being fewer than the remaining latency violation count criterion, an adjustment made at act 730 may be to decrease a current remaining latency budget criterion.

At act 735, the user equipment may determine whether an adjusted remaining latency budget criterion violates an adjusted remaining latency budget criterion criterion. If a determination made at act 735 is that an adjusted remaining latency budget criterion does not violate an adjusted remaining latency budget criterion criterion, method 700 may advance to act 745. If a determination made at act 735 is that an adjusted remaining latency budget criterion violates an adjusted remaining latency budget criterion criterion, method 700 advances to act 740 and may reset a current remaining latency budget criterion. For example, if an adjusted remaining latency budget criterion has been adjusted such that the adjusted remaining latency budget criterion exceeds a maximum adjusted remaining latency budget criterion criterion, or if an adjusted remaining latency budget criterion has been adjusted such that the adjusted remaining latency budget criterion is less than a minimum adjusted remaining latency budget criterion criterion, the user equipment may reset the adjusted remaining latency budget criterion at act 740. The user equipment may reset the adjusted rating latency budget criterion to the initial remaining latency budget criterion, or to another criterion value.

At act 745, the user equipment may determine whether a traffic session corresponding to the packets analyzed at act 715 has ended. If the traffic session has not ended, method 700 may return to act 715. If the user equipment determines that the traffic session is complete, method 700 advances to act 750 and ends.

Figure 7B:
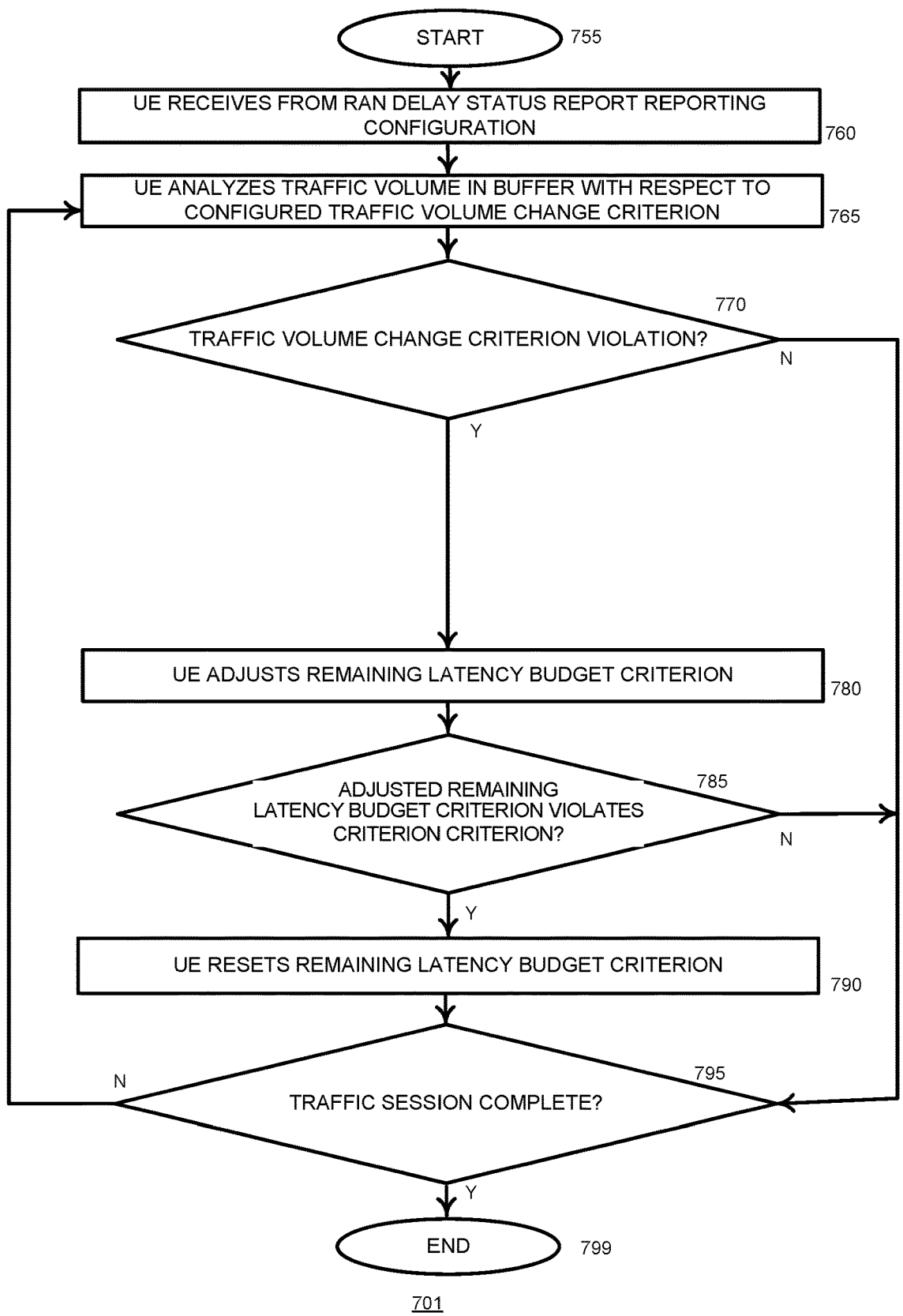
FIG. 7B illustrates a flow diagram of an example embodiment method of dynamically adjusting a remaining latency budget criterion based on a buffered volume change.

Turning now to FIG. 7B, the figure illustrates a flow diagram of an example embodiment method 701. Method 701 begins at act 755. At act 760, a user equipment may receive from a serving radio access network node a delay status report reporting configuration. The reporting configuration may comprise at least one remaining latency budget criterion. The at least one remaining latency budget criterion may be an initial remaining latency budget criterion. The delay status report reporting configuration may comprise a buffer volume change criterion. In an embodiment, the delay status report reporting configuration may comprise a maximum buffer volume change criterion or a minimum buffer volume change criterion. At act 765, the user equipment may analyze a volume of traffic stored in a buffer of the user equipment with respect to a buffer volume change criterion included in the configuration received act 760. At act 770, the user equipment may determine whether a traffic volume stored in the buffer of the user equipment has increased more than a maximum buffer volume change criterion or has decreased more than a buffer volume change criterion. The determination of a traffic volume change may be determined as a difference between a volume at a first time/period and a volume at a second time/period. If the user equipment determines at act 770 that a traffic volume change criterion violation has not occurred, method 701 advances to act 795.

If the user equipment determines that act 770 that a traffic volume change criterion violation has occurred, method 701 advances to act 780. At act 780, the user equipment may adjust a remaining latency budget criterion by a volume-based step value, either up (increase) or down (decrease), respectively based on whether the traffic volume change criterion violation determined at act 770 corresponds to an increase in buffered traffic volume equal to or greater than a maximum traffic volume change criterion or whether the traffic volume change criterion violation determined at act 770 corresponds to a decrease in buffer traffic volume equal to or greater than a traffic volume change criterion.

At act 785, the user equipment may determine whether a remaining latency budget criterion, adjusted at act 780, violates an adjusted remaining latency budget criterion criterion. If a determination made at act 785 is that an adjusted remaining latency budget criterion does not violate an adjusted remaining latency budget criterion criterion, method 701 may advance to act 795. If a determination made at act 785 is that an adjusted remaining latency budget criterion violates an adjusted remaining latency budget criterion criterion, method 701 advances to act 790 and may reset a current remaining latency budget criterion. For example, if an adjusted remaining latency budget criterion has been adjusted such that the adjusted remaining latency budget criterion exceeds a maximum adjusted remaining latency budget criterion criterion, or if an adjusted remaining latency budget criterion has been adjusted such that the adjusted remaining latency budget criterion is less than a minimum adjusted remaining latency budget criterion criterion, the user equipment may reset the adjusted remaining latency budget criterion. The user equipment may reset the adjusted rating latency budget criterion to the initial remaining latency budget criterion, or to another criterion value. At act 795, the user equipment may determine whether a traffic session corresponding to the packets analyzed at act 765 has ended. If the traffic session has not ended, method 700 returns to act 765. If the user equipment determines that the traffic session is complete, method 700 advances to act 799 and ends.

Figure 8:
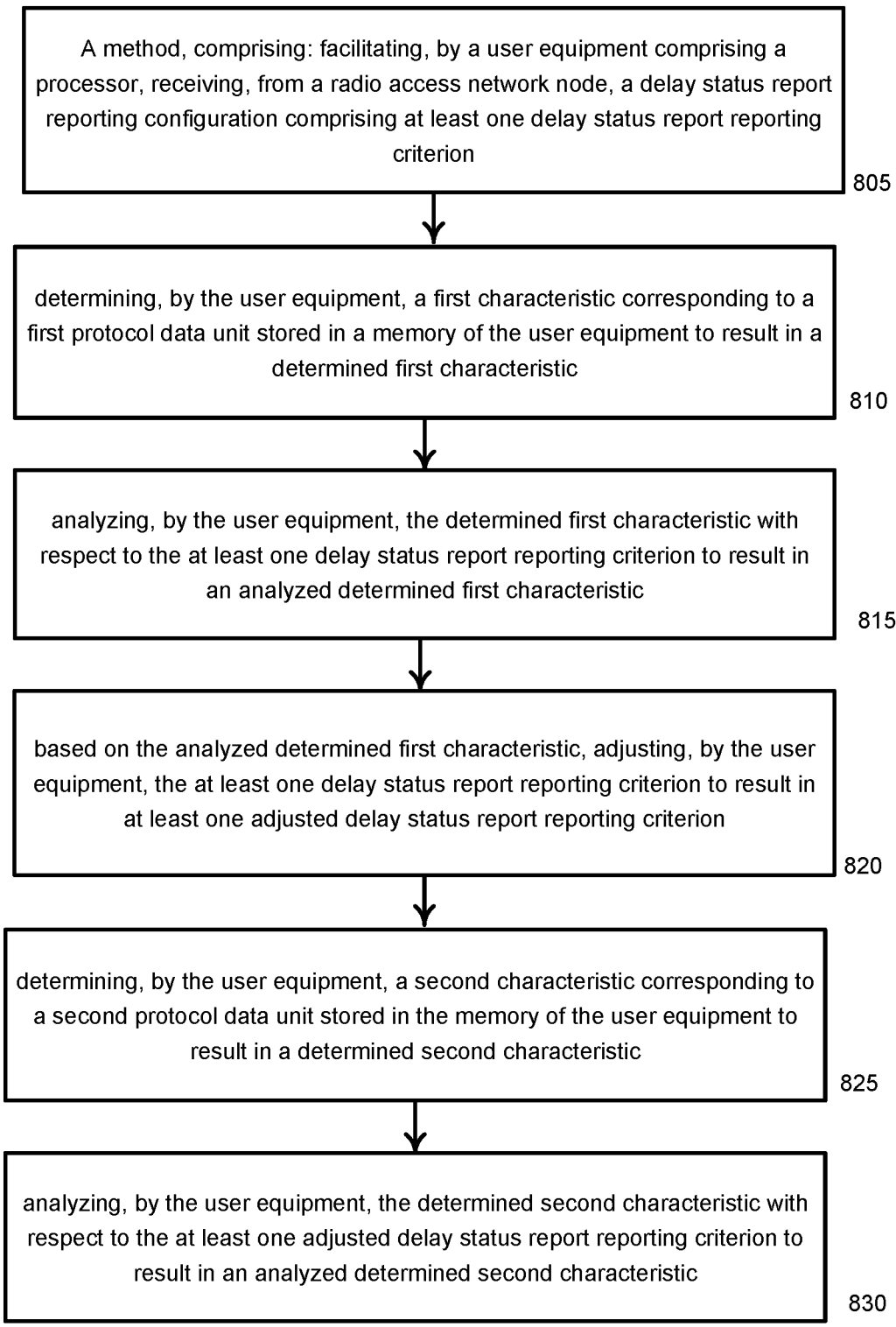
FIG. 8 illustrates a block diagram of an example method embodiment.

Turning now to FIG. 8, the figure illustrates an example embodiment method 800 comprising at block 805 facilitating, by a user equipment comprising a processor, receiving, from a radio access network node, a delay status report reporting configuration comprising at least one delay status report reporting criterion; at block 810 determining, by the user equipment, a first characteristic corresponding to a first protocol data unit stored in a memory of the user equipment to result in a determined first characteristic; at block 815 analyzing, by the user equipment, the determined first characteristic with respect to the at least one delay status report reporting criterion to result in an analyzed determined first characteristic; at block 820 based on the analyzed determined first characteristic, adjusting, by the user equipment, the at least one delay status report reporting criterion to result in at least one adjusted delay status report reporting criterion; at block 825 determining, by the user equipment, a second characteristic corresponding to a second protocol data unit stored in the memory of the user equipment to result in a determined second characteristic; and at block 830 analyzing, by the user equipment, the determined second characteristic with respect to the at least one adjusted delay status report reporting criterion to result in an analyzed determined second characteristic.

Figure 9:
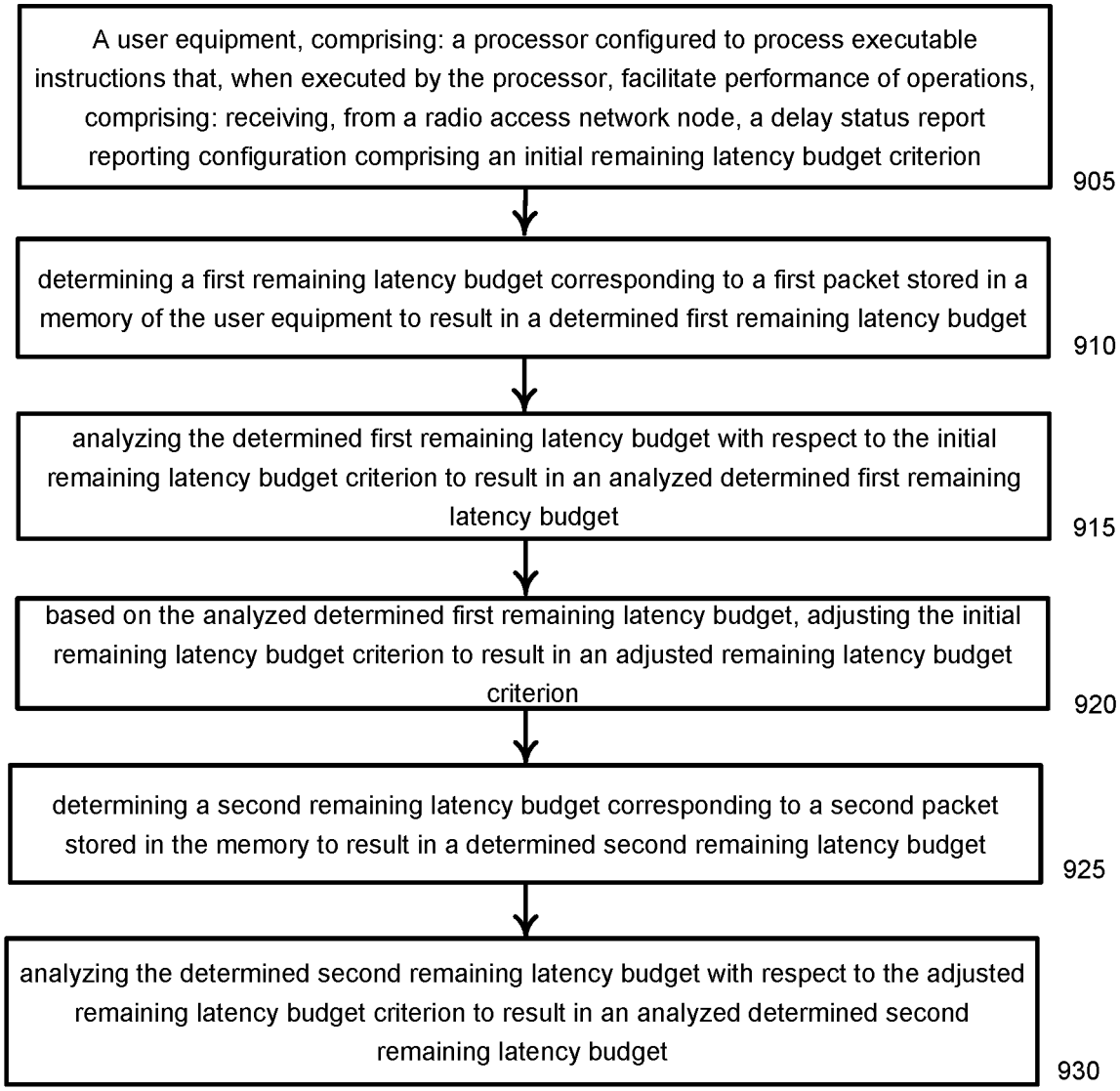
FIG. 9 illustrates a block diagram of an example user equipment.

Turning now to FIG. 9, the figure illustrates an example user equipment, comprising at block 905 a processor configured to process executable instructions that, when executed by the processor, facilitate performance of operations, comprising receiving, from a radio access network node, a delay status report reporting configuration comprising an initial remaining latency budget criterion; at block 910 determining a first remaining latency budget corresponding to a first packet stored in a memory of the user equipment to result in a determined first remaining latency budget; at block 915 analyzing the determined first remaining latency budget with respect to the initial remaining latency budget criterion to result in an analyzed determined first remaining latency budget; at block 920 based on the analyzed determined first remaining latency budget, adjusting the initial remaining latency budget criterion to result in an adjusted remaining latency budget criterion; at block 925 determining a second remaining latency budget corresponding to a second packet stored in the memory to result in a determined second remaining latency budget; and at block 930 analyzing the determined second remaining latency budget with respect to the adjusted remaining latency budget criterion to result in an analyzed determined second remaining latency budget.

Figure 10:
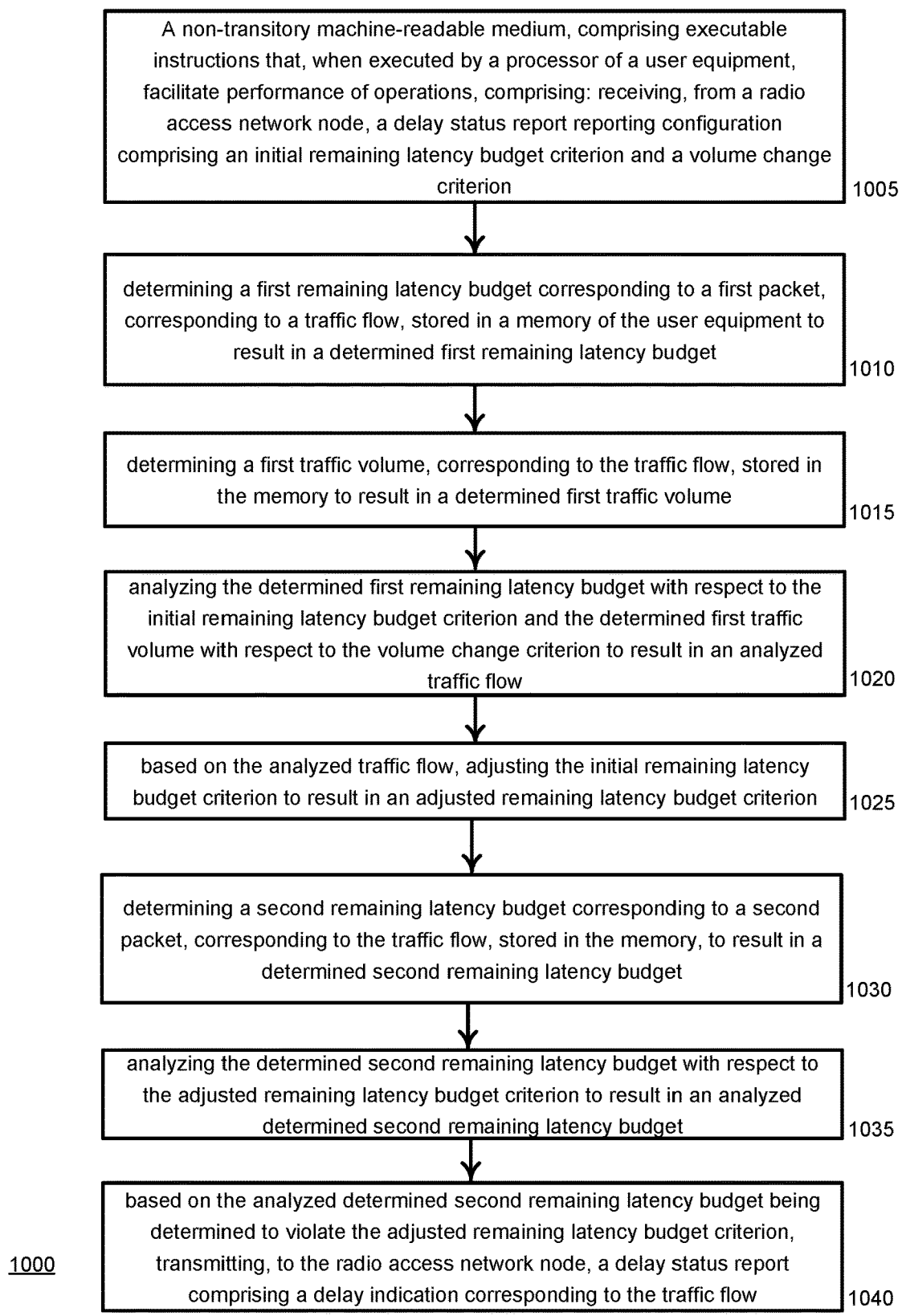
FIG. 10 illustrates a block diagram of an example non-transitory machine-readable medium embodiment.

Turning now to FIG. 10, the figure illustrates a non-transitory machine-readable medium 1000 comprising at block 1005 executable instructions that, when executed by a processor of user equipment, facilitate performance of operations, comprising receiving, from a radio access network node, a delay status report reporting configuration comprising an initial remaining latency budget criterion and a volume change criterion; at block 1010 determining a first remaining latency budget corresponding to a first packet, corresponding to a traffic flow, stored in a memory of the user equipment to result in a determined first remaining latency budget; at block 1015 determining a first traffic volume, corresponding to the traffic flow, stored in the memory to result in a determined first traffic volume; at block 1020 analyzing the determined first remaining latency budget with respect to the initial remaining latency budget criterion and the determined first traffic volume with respect to the volume change criterion to result in an analyzed traffic flow; at block 1025 based on the analyzed traffic flow, adjusting the initial remaining latency budget criterion to result in an adjusted remaining latency budget criterion; at block 1030 determining a second remaining latency budget corresponding to a second packet, corresponding to the traffic flow, stored in the memory, to result in a determined second remaining latency budget; at block 1035 analyzing the determined second remaining latency budget with respect to the adjusted remaining latency budget criterion to result in an analyzed determined second remaining latency budget; and at block 1040 based on the analyzed determined second remaining latency budget being determined to violate the adjusted remaining latency budget criterion, transmitting, to the radio access network node, a delay status report comprising a delay indication corresponding to the traffic flow.

Figure 11:
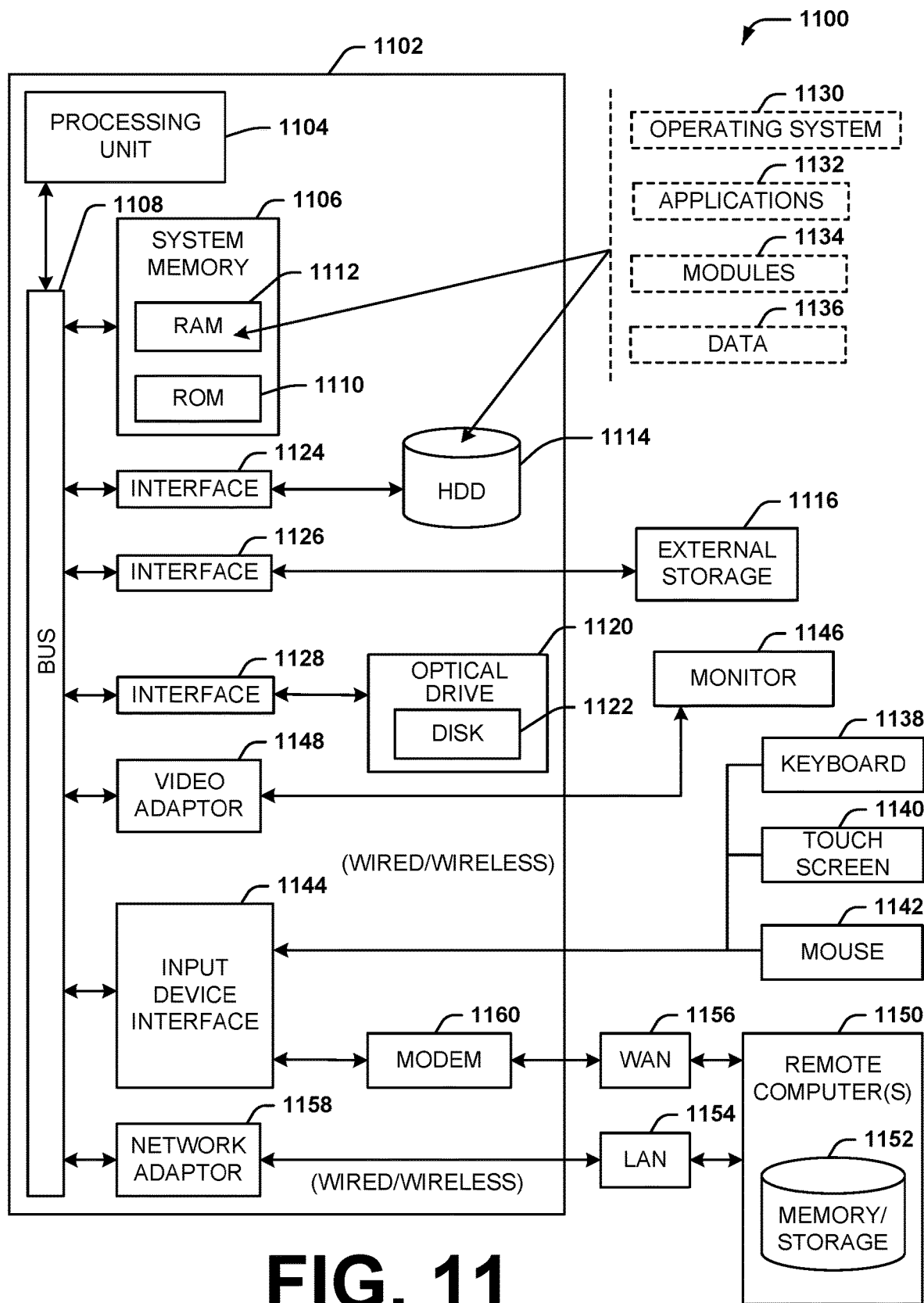
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
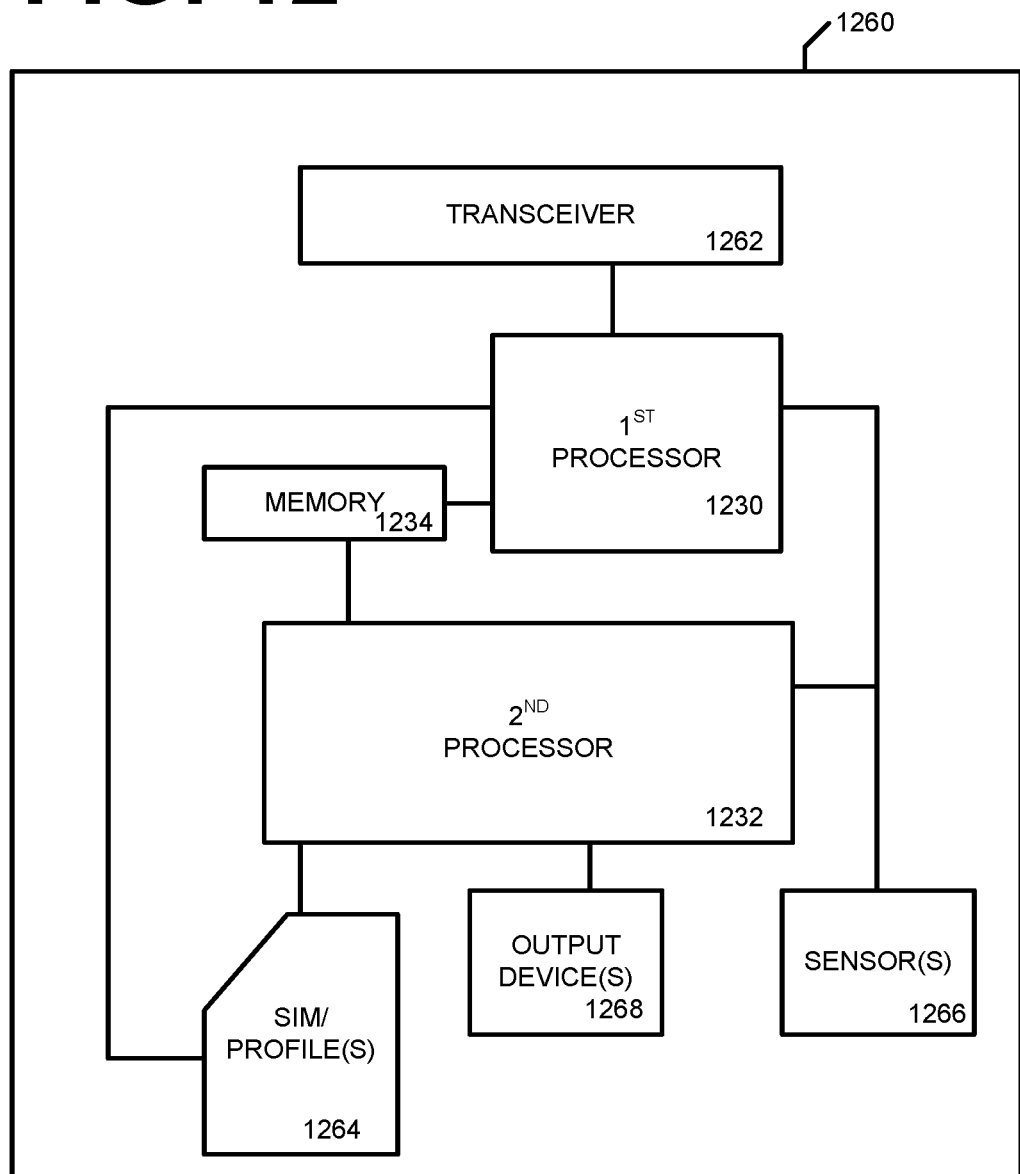
FIG. 12 illustrates a block diagram of an example wireless user equipment.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |

TABLE 1-continued

| Term | Definition |
| --- | --- |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    facilitating, by a user equipment comprising a processor, receiving, from a radio access network node, a delay status report reporting configuration comprising at least one delay status report reporting criterion;
    determining, by the user equipment, a first characteristic corresponding to a first protocol data unit stored in a memory of the user equipment to result in a determined first characteristic;
    analyzing, by the user equipment, the determined first characteristic with respect to the at least one delay status report reporting criterion to result in an analyzed determined first characteristic;
    based on the analyzed determined first characteristic, adjusting, by the user equipment, the at least one delay status report reporting criterion to result in at least one adjusted delay status report reporting criterion;
    determining, by the user equipment, a second characteristic corresponding to a second protocol data unit stored in the memory of the user equipment to result in a determined second characteristic; and
    analyzing, by the user equipment, the determined second characteristic with respect to the at least one adjusted delay status report reporting criterion to result in an analyzed determined second characteristic.

2. The method of claim 1, wherein the at least one delay status report reporting criterion comprises an initial remaining latency budget criterion and a latency violation count criterion corresponding to a violation period, wherein the delay status report reporting configuration further comprises a remaining latency step value applicable to the adjusting of the at least one delay status report reporting criterion, wherein the first characteristic is a first remaining latency budget, wherein the determined first characteristic is a determined first remaining latency budget, wherein the second characteristic is a second remaining latency budget, wherein the determined second characteristic is a determined second remaining latency budget, wherein the analyzing of the determined first characteristic comprises:
    determining that the determined first remaining latency budget is a violation occurrence that corresponds to exceeding the latency violation count criterion during the violation period, and
    wherein the adjusting of the at least one delay status report reporting criterion comprises:
    increasing the initial remaining latency budget criterion by the remaining latency step value.

3. The method of claim 1, wherein the at least one delay status report reporting criterion comprises an initial remaining latency budget criterion and a latency violation count criterion corresponding to a violation period, wherein the delay status report reporting configuration further comprises a remaining latency step value applicable to the adjusting of the at least one delay status report reporting criterion, wherein the first characteristic is a first remaining latency budget, wherein the determined first characteristic is a determined first remaining latency budget, wherein the second characteristic is a second remaining latency budget, wherein the determined second characteristic is a determined second remaining latency budget, wherein the analyzing of the determined first characteristic comprises:
    determining that the determined first remaining latency budget is a violation occurrence that corresponds to failure to exceed the latency violation count criterion during the violation period, and
    wherein the adjusting of the at least one delay status report reporting criterion comprises:
    decreasing the initial remaining latency budget criterion by the remaining latency step value.

4. The method of claim 1, wherein the at least one delay status report reporting criterion comprises an initial remaining latency budget criterion and a volume change criterion, wherein the delay status report reporting configuration further comprises a remaining latency step value applicable to the adjusting of the at least one delay status report reporting criterion, wherein the first characteristic is a first volume of traffic stored in the memory, wherein the determined first characteristic is a determined first volume of traffic stored in the memory, wherein the second characteristic is a second volume of traffic stored in the memory, wherein the determined second characteristic is a determined second volume of traffic stored in the memory, wherein the analyzing of the determined first characteristic comprises:
    determining that the determined first volume of traffic corresponds to exceeding the volume change criterion, and wherein the adjusting of the at least one delay status report reporting criterion comprises:
increasing the initial remaining latency budget criterion by the remaining latency step value.

5. The method of claim 1, wherein the at least one delay status report reporting criterion comprises an initial remaining latency budget criterion and a volume change criterion, wherein the delay status report reporting configuration further comprises a remaining latency step value applicable to the adjusting of the at least one delay status report reporting criterion, wherein the first characteristic is a first volume of traffic stored in the memory, wherein the determined first characteristic is a determined first volume of traffic stored in the memory, wherein the second characteristic is a second volume of traffic stored in the memory, wherein the determined second characteristic is a determined second volume of traffic stored in the memory, wherein the analyzing of the determined first characteristic comprises:
determining that the determined first volume of traffic corresponds to failure to exceed the volume change criterion, and
wherein the adjusting of the at least one delay status report reporting criterion comprises:
increasing the initial remaining latency budget criterion by the remaining latency step value.

6. The method of claim 1, wherein the at least one delay status report reporting criterion comprises an initial remaining latency budget criterion, wherein the at least one adjusted delay status report reporting criterion comprises an adjusted remaining latency budget criterion, wherein the delay status report reporting configuration further comprises an adjusted remaining latency budget criterion criterion, and the method further comprising:
determining, by the user equipment, that the adjusted remaining latency budget criterion fails to satisfy the adjusted remaining latency budget criterion criterion; and
based on the determining that the adjusted remaining latency budget criterion fails to satisfy the adjusted remaining latency budget criterion criterion, resetting, by the user equipment, the adjusted remaining latency budget criterion to the initial remaining latency budget criterion.

7. The method of claim 1, further comprising:
based on the analyzed determined second characteristic being determined by the user equipment to violate the at least one adjusted delay status report reporting criterion, facilitating, by the user equipment, reporting, to the radio access network node, a delay status report comprising a delay indication corresponding to the second protocol data unit.

8. The method of claim 1, wherein the first protocol data unit and the second protocol data unit are associated with a logical channel, and wherein the at least one delay status report reporting criterion corresponds to the logical channel.

9. The method of claim 1, wherein the first protocol data unit and the second protocol data unit are associated with a first traffic flow, and wherein traffic corresponding to a second traffic flow is stored in the memory.

10. The method of claim 9, wherein the at least one delay status report reporting criterion is at least one first delay status report reporting criterion corresponding to the first traffic flow, and wherein at least one second delay status report reporting criterion corresponds to the second traffic flow.

11. A user equipment, comprising:
a processor configured to process executable instructions that, when executed by the processor, facilitate performance of operations, comprising:
receiving, from a radio access network node, a delay status report reporting configuration comprising an initial remaining latency budget criterion;
determining a first remaining latency budget corresponding to a first packet stored in a memory of the user equipment to result in a determined first remaining latency budget;
analyzing the determined first remaining latency budget with respect to the initial remaining latency budget criterion to result in an analyzed determined first remaining latency budget;
based on the analyzed determined first remaining latency budget, adjusting the initial remaining latency budget criterion to result in an adjusted remaining latency budget criterion;
determining a second remaining latency budget corresponding to a second packet stored in the memory to result in a determined second remaining latency budget; and
analyzing the determined second remaining latency budget with respect to the adjusted remaining latency budget criterion to result in an analyzed determined second remaining latency budget.

12. The user equipment of claim 11, wherein the delay status report reporting configuration further comprises a latency violation count criterion corresponding to a violation period and a remaining latency step value, associated with the latency violation count criterion, applicable to the adjusting of the initial remaining latency budget criterion, wherein the analyzing of the determined first remaining latency budget comprises:
determining that the determined first remaining latency budget is a violation occurrence that corresponds to exceeding the latency violation count criterion during the violation period, and
wherein the adjusting of the initial remaining latency budget criterion comprises:
increasing the initial remaining latency budget criterion by the remaining latency step value.

13. The user equipment of claim 11, wherein the delay status report reporting configuration further comprises a latency violation count criterion corresponding to a violation period and a remaining latency step value, associated with the latency violation count criterion, applicable to the adjusting of the initial remaining latency budget criterion, wherein the analyzing of the determined first remaining latency budget comprises:
determining that the determined first remaining latency budget is a violation occurrence that corresponds to failure to exceed the latency violation count criterion during the violation period, and
wherein the adjusting of the initial remaining latency budget criterion comprises:
decreasing the initial remaining latency budget criterion by the remaining latency step value.

14. The user equipment of claim 11, wherein the delay status report reporting configuration further comprises a volume change criterion and a remaining latency step value, associated with the volume change criterion, applicable to the adjusting of the initial remaining latency budget criterion, wherein the first packet corresponds to a first volume of traffic stored in the memory, wherein the second packet corresponds to a second volume of traffic stored in the memory, wherein the analyzing of the determined first remaining latency budget comprises:
    determining that the first volume of traffic corresponds to exceeding the volume change criterion, and
    wherein the adjusting of the initial remaining latency budget criterion comprises:
    increasing, by the user equipment, the initial remaining latency budget criterion by the remaining latency step value.

15. The user equipment of claim 14, wherein the operations further comprise:
    based on the analyzed determined second remaining latency budget being determined to violate the adjusted remaining latency budget criterion, reporting, by the user equipment to the radio access network node, a delay status report comprising a delay indication corresponding to the second packet.

16. A non-transitory machine-readable medium, comprising executable instructions that, when executed by a processor of a user equipment, facilitate performance of operations, comprising:
    receiving, from a radio access network node, a delay status report reporting configuration comprising an initial remaining latency budget criterion and a volume change criterion;
    determining a first remaining latency budget corresponding to a first packet, corresponding to a traffic flow, stored in a memory of the user equipment to result in a determined first remaining latency budget;
    determining a first traffic volume, corresponding to the traffic flow, stored in the memory to result in a determined first traffic volume;
    analyzing the determined first remaining latency budget with respect to the initial remaining latency budget criterion and the determined first traffic volume with respect to the volume change criterion to result in an analyzed traffic flow;
    based on the analyzed traffic flow, adjusting the initial remaining latency budget criterion to result in an adjusted remaining latency budget criterion;
    determining a second remaining latency budget corresponding to a second packet, corresponding to the traffic flow, stored in the memory, to result in a determined second remaining latency budget;
    analyzing the determined second remaining latency budget with respect to the adjusted remaining latency budget criterion to result in an analyzed determined second remaining latency budget; and
    based on the analyzed determined second remaining latency budget being determined to violate the adjusted remaining latency budget criterion, transmitting, to the radio access network node, a delay status report comprising a delay indication corresponding to the traffic flow.

17. The non-transitory machine-readable medium of claim 16, wherein the delay status report reporting configuration further comprises a latency violation count criterion corresponding to a violation period and a remaining latency adjustment step, associated with the latency violation count criterion, applicable to the adjusting of the initial remaining latency budget criterion, wherein the analyzing of the determined first remaining latency budget with respect to the initial remaining latency budget criterion and the determined first traffic volume with respect to the volume change criterion comprises:
    determining that the determined first remaining latency budget corresponds to violation of the latency violation count criterion during the violation period, and
    wherein the adjusting of the initial remaining latency budget criterion comprises:
    increasing the initial remaining latency budget criterion by the remaining latency adjustment step.

18. The non-transitory machine-readable medium of claim 16, wherein the delay status report reporting configuration further comprises a latency violation count criterion corresponding to a violation period and a remaining latency adjustment step, associated with the latency violation count criterion, applicable to the adjusting of the initial remaining latency budget criterion, wherein the analyzing of the determined first remaining latency budget with respect to the initial remaining latency budget criterion and the determined first traffic volume with respect to the volume change criterion comprises:
    determining that the determined first remaining latency budget corresponds to failure to violate the latency violation count criterion during the violation period, and
    wherein the adjusting of the initial remaining latency budget criterion comprises:
    decreasing the initial remaining latency budget criterion by the remaining latency adjustment step.

19. The non-transitory machine-readable medium of claim 16, wherein the delay status report reporting configuration further comprises a volume-based adjustment step, associated with the volume change criterion, applicable to the adjusting of the initial remaining latency budget criterion, wherein the analyzing of the determined first remaining latency budget comprises:
    determining that the first traffic volume corresponds to failure to be less than the volume change criterion, and
    wherein the adjusting of the initial remaining latency budget criterion comprises:
    increasing the initial remaining latency budget criterion by the volume-based adjustment step.

20. The non-transitory machine-readable medium of claim 16, wherein the delay status report reporting configuration further comprises a volume-based adjustment step, associated with the volume change criterion, applicable to the adjusting of the initial remaining latency budget criterion, wherein the analyzing of the determined first remaining latency budget comprises:
    determining that the first traffic volume corresponds to being less than the volume change criterion, and
    wherein the adjusting of the initial remaining latency budget criterion comprises:
    decreasing the initial remaining latency budget criterion by the volume-based adjustment step.

* * * * *